(12) United States Patent
Song et al.

(10) Patent No.: US 12,197,642 B2
(45) Date of Patent: Jan. 14, 2025

(54) ELECTRONIC DEVICE AND METHOD THEREOF FOR TRACKING USER GAZE AND PROVIDING AUGMENTED REALITY SERVICE

(71) Applicant: Samsung Electronics Co., Ltd., Suwon-si (KR)

(72) Inventors: Hyoungil Song, Suwon-si (KR); Yonghyun Park, Suwon-si (KR); Doukyoung Song, Suwon-si (KR); Jina Jeon, Suwon-si (KR); Dongok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/303,221

(22) Filed: Apr. 19, 2023

(65) Prior Publication Data

US 2023/0259205 A1    Aug. 17, 2023

Related U.S. Application Data

(63) Continuation of application No. PCT/KR2022/001668, filed on Jan. 28, 2022.

(30) Foreign Application Priority Data

Feb. 2, 2021   (KR) .......................... 10-2021-0014989

(51) Int. Cl.
*G06F 3/01*   (2006.01)
*F21V 8/00*   (2006.01)
(Continued)

(52) U.S. Cl.
CPC .......... *G06F 3/013* (2013.01); *G02B 6/0073* (2013.01); *G02B 27/0093* (2013.01);
(Continued)

(58) Field of Classification Search
CPC ............ G06F 3/013; G02B 2027/0178; G02B 2027/0187; G02B 2027/014; G02B 2027/0138; G02B 6/0073
See application file for complete search history.

(56) References Cited

U.S. PATENT DOCUMENTS 8,878,749 B1   11/2014   Wu et al.
8,942,419 B1    1/2015   Wu et al.
(Continued)

FOREIGN PATENT DOCUMENTS

EP   3 318 914 A1    5/2018
JP   2017-116768 A   6/2017
(Continued)

OTHER PUBLICATIONS

Extended European Search Report dated Mar. 5, 2024, issued in European Application No. 22750004.8-1224.

*Primary Examiner* — Hang Lin
(74) *Attorney, Agent, or Firm* — Jefferson IP Law, LLP

(57) ABSTRACT

An electronic device performing a method of tracking a user's gaze of an electronic device and outputting an augmented reality (AR) image is provided. The metho includes outputting a first light which is a structured light at a first time point toward the user's eyes, outputting a second light at a second time point toward the user's eyes, acquiring a first image in response to the output of the first light at the first time point, acquiring a second image in response to the output of the second light at the second time point, synthesizing the first image and the second image to create a third image, calculating first coordinate values, which are coordinate values of pupils of the user's eyes on the basis of the third image; and detecting a gaze direction on the basis of the first coordinate values.

19 Claims, 10 Drawing Sheets

(51) Int. Cl.
*G02B 27/00* (2006.01)
*G02B 27/01* (2006.01)

(52) U.S. Cl.
CPC ....... *G02B 27/0101* (2013.01); *G02B 27/017* (2013.01); *G02B 27/0179* (2013.01); *G02B 2027/0138* (2013.01); *G02B 2027/014* (2013.01); *G02B 2027/0178* (2013.01); *G02B 2027/0187* (2013.01)

(56) References Cited

U.S. PATENT DOCUMENTS

| | | | |
|---|---|---|---|
| 9,916,005 B2 | 3/2018 | Aronsson | |
| 9,983,709 B2 | 5/2018 | Trail et al. | |
| 10,409,368 B2 | 9/2019 | Cho et al. | |
| 10,585,477 B1 | 3/2020 | Cavin et al. | |
| 10,725,537 B2 | 7/2020 | Iseringhausen et al. | |
| 10,838,132 B1 * | 11/2020 | Calafiore | G02B 6/0015 |
| 11,768,376 B1 * | 9/2023 | Pedder | G02B 27/0179 345/694 |
| 2013/0114850 A1 | 5/2013 | Publicover et al. | |
| 2015/0242680 A1 | 8/2015 | Thukral et al. | |
| 2017/0147859 A1 | 5/2017 | Zhang et al. | |
| 2018/0032133 A1 * | 2/2018 | Cho | G06F 3/013 |
| 2018/0106999 A1 | 4/2018 | Wilson et al. | |
| 2019/0025587 A1 | 1/2019 | Osterhout et al. | |
| 2019/0086630 A1 * | 3/2019 | Zhong | G02B 7/02 |
| 2020/0012105 A1 | 1/2020 | Liu et al. | |
| 2020/0348755 A1 | 11/2020 | Gebauer et al. | |
| 2021/0003848 A1 | 1/2021 | Choi et al. | |
| 2021/0176383 A1 * | 6/2021 | Kim | H04N 23/80 |
| 2021/0240250 A1 * | 8/2021 | Okano | G06F 1/3287 |

FOREIGN PATENT DOCUMENTS

| | | |
|---|---|---|
| JP | 2019-017491 A | 2/2019 |
| KR | 10-2017-0082457 A | 7/2017 |
| KR | 10-2018-0033222 A | 4/2018 |
| KR | 10-1990559 B1 | 6/2019 |
| KR | 10-2021-0004776 A | 1/2021 |
| WO | 2019/147677 A1 | 8/2019 |

* cited by examiner

ELECTRONIC DEVICE AND METHOD THEREOF FOR TRACKING USER GAZE AND PROVIDING AUGMENTED REALITY SERVICE

CROSS-REFERENCE TO RELATED APPLICATION(S)

This application is a continuation application, claiming priority under § 365(c), of an International application No. PCT/KR2022/001668, filed on Jan. 28, 2022, which is based on and claims the benefit of a Korean patent application number 10-2021-0014989, filed on Feb. 2, 2021, in the Korean Intellectual Property Office, the disclosure of which is incorporated by reference herein in its entirety.

BACKGROUND

1. Field

The disclosure relates to an electronic device. More particularly, the disclosure relates to a wearable electronic device includes a camera for implementing augmented reality (AR).

2. Description of Related Art

An electronic device may provide virtual reality (VR), which allows a user to experience a virtual world created by a computer that is similar to the real world. In addition, the electronic device may provide augmented reality (AR) in which virtual information (or objects) is added to the real world and mixed reality (MR) in which virtual reality and augmented reality are mixed. The electronic device may include a head up display for providing such virtual reality and augmented reality.

The AR may mean a technology that expresses by adding elements created through computer graphic processing to the real world recognized by the user. For example, a virtual object including information related to an object existing in reality is added to the object existing in reality and displayed together by means of augmented reality technology.

Augmented reality may be implemented through various devices. Representatively, augmented reality may be implemented through a wearable electronic device such as a glasses-type wearable electronic device or a head mounted display (HMD).

Among the above-mentioned devices, an image may be displayed on lenses of glasses in order to implement augmented reality in the glasses-type wearable electronic device. An image may be displayed on the lenses by projecting light onto the lenses of the glasses. For example, a projector with a very small size (e.g., a micro projector or a pico projector) is used. Examples of the projector include a laser scanning display (LSD), a digital micro-mirror display (DMD), or a liquid crystal on silicon (LCoS). In addition, an image may be displayed on the lenses by means of a transparent display.

The above information is presented as background information only to assist with an understanding of the disclosure. No determination has been made, and no assertion is made, as to whether any of the above might be applicable as prior art with regard to the disclosure.

SUMMARY

The electronic device may need to track a user's gaze to implement augmented reality. The electronic device may irradiate light to the user's eyes or pupils in order to track the user's gaze, and may include a light source for irradiating the light. For an accurate gaze track, the number of light sources may increase, and as the number of light sources increases, a large number of light sources need be placed within a limited electronic device mounting space, thus a size of the electronic device may increase, a weight, and/or power consumption thereof may also increase. As described above, when the number of light sources increases, the volume and weight of the electronic device increase, resulting in a decrease in wearing comfort and an increase in unit price. In addition, running time may be reduced due to power required to drive a plurality of light sources. Arranging the plurality of light sources may be consume space.

Aspects of the disclosure are to are to address at least the abovementioned problems and/or disadvantages and to provide at least the advantages described below. Accordingly, an aspect of the disclosure is to provide a wearable electronic device includes a camera for implementing augmented reality (AR).

Additional aspects will be set forth in part in the description which follows and, in part, will be apparent from the description, or may be learned by practice of the presented embodiments.

In accordance with an aspect of the disclosure, an electronic device is provided. The electronic device includes a main body, a glass supported by the main body, a support rotatably connected to the main body, a first light optical output module configured to irradiate a first light that is a structured light toward a user's eyes disposed at the rear of the main body, a second light optical output module configured to irradiate a second light toward the user's eyes, a camera configured to photograph the user's eyes, and at least one processor operatively connected to the first light optical output module, the second light optical output module, and the camera, in which the at least one processor may be configured to control the first light optical output module to output the first light at a first time point, control the second light optical output module to output the second light at a second time point, acquire a first image in response to the output of the first light at the first time point by means of the camera, acquire a second image in response to the output of the second light at the second time point by means of the camera, synthesize the first image and the second image to create a third image, calculate first coordinate values, which are coordinate values of user's pupils on the basis of the third image, detect a gaze direction of the user on the basis of the first coordinate values.

In accordance with another aspect of the disclosure, a method of tracking a user's gaze of an electronic device and outputting an augmented reality (AR) image are provided. The method includes outputting a first light which is a structured light at a first time point toward the user's eyes, outputting a second light at a second time point toward the user's eyes, acquiring a first image in response to the output of the first light at the first time point, acquiring a second image in response to the output of the second light at the second time point, synthesizing the first image and the second image to create a third image, calculating first coordinate values, which are coordinate values of pupils of the user's eyes on the basis of the third image, and detecting a gaze direction on the basis of the first coordinate values.

According to various embodiments disclosed in the document, it is possible to simplify circuit configuration of an electronic device by removing a plurality of light sources and by means of only one or two light sources and to minimize current consumption and to expect aesthetic effects by improving a design. In addition, an effect of three or more light sources may be implemented using only one or two light sources, and errors in the gaze track due to changes in a wearing position of the electronic device may be minimized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
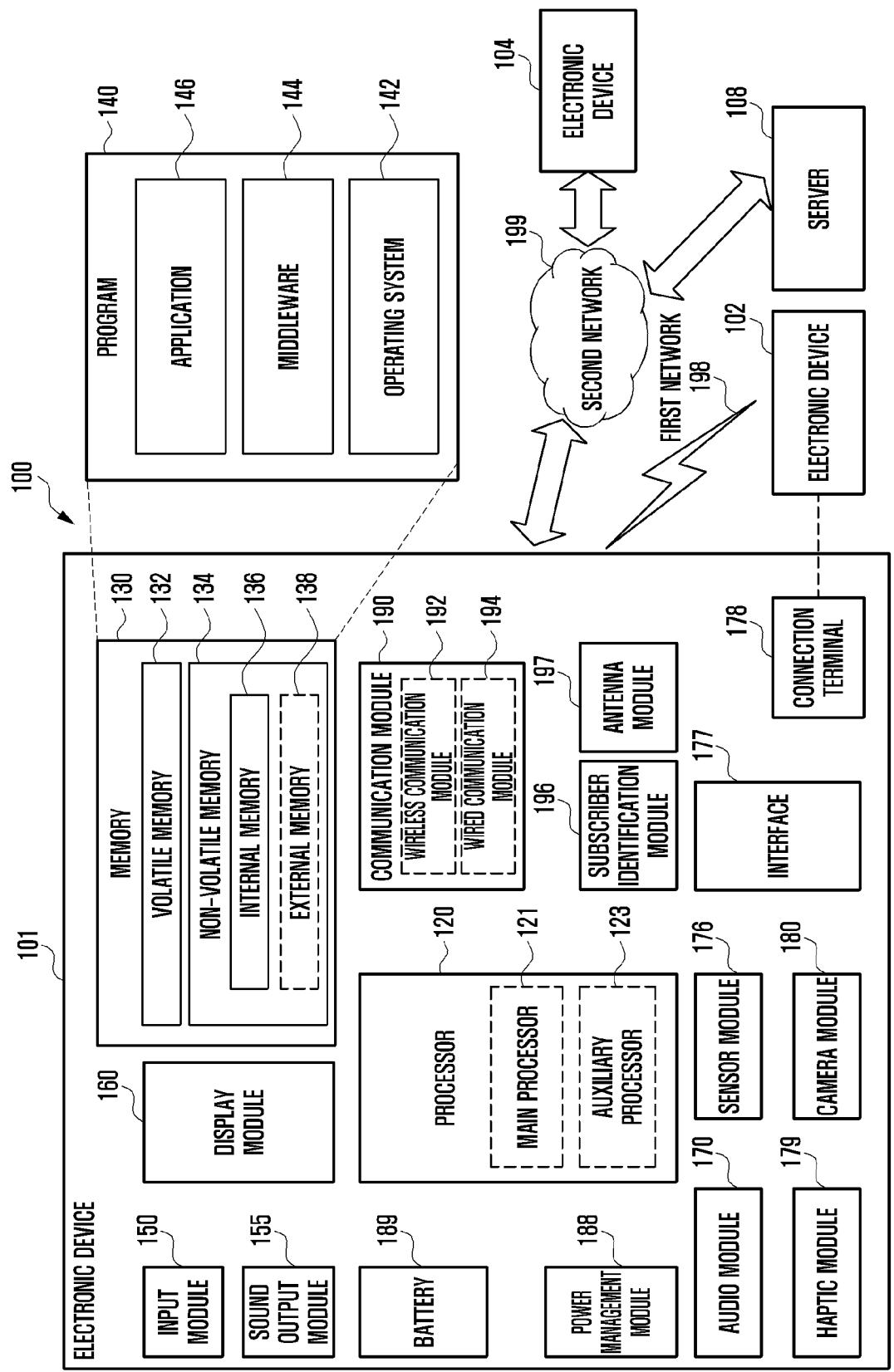
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to yet another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to yet another embodiment, the auxiliary processor 123 (e.g., an image signal processor or a communication processor) may be implemented as part of another component (e.g., the camera module 180 or the communication module 190) functionally related to the auxiliary processor 123. According to yet another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to yet another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to yet another embodiment, the display module 160 may include a touch sensor adapted to detect a touch, or a pressure sensor adapted to measure the intensity of force incurred by the touch.

The audio module 170 may convert a sound into an electrical signal and vice versa. According to yet another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to yet another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to yet another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to yet another embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to yet another embodiment, the haptic module 179 may include, for example, a motor, a piezoelectric element, or an electric stimulator.

The camera module 180 may capture a still image or moving images. According to yet another embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to yet another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to yet another embodiment, the antenna module 197 may include an antenna including a radiating element composed of a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to various embodiments, the antenna module 197 may form a mmWave antenna module. According to yet another embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to yet another embodiment, all or some of operations to be executed at the electronic device 101 may be executed at one or more of the external electronic devices 102, or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using at least one of machine learning or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to yet another embodiment, the electronic device 101 may be an AR device (e.g., AR glasses, head mounted display (HMD) device) that is worn on a user's head and capable of providing an image related to an augmented reality service to the user.

Figure 2:
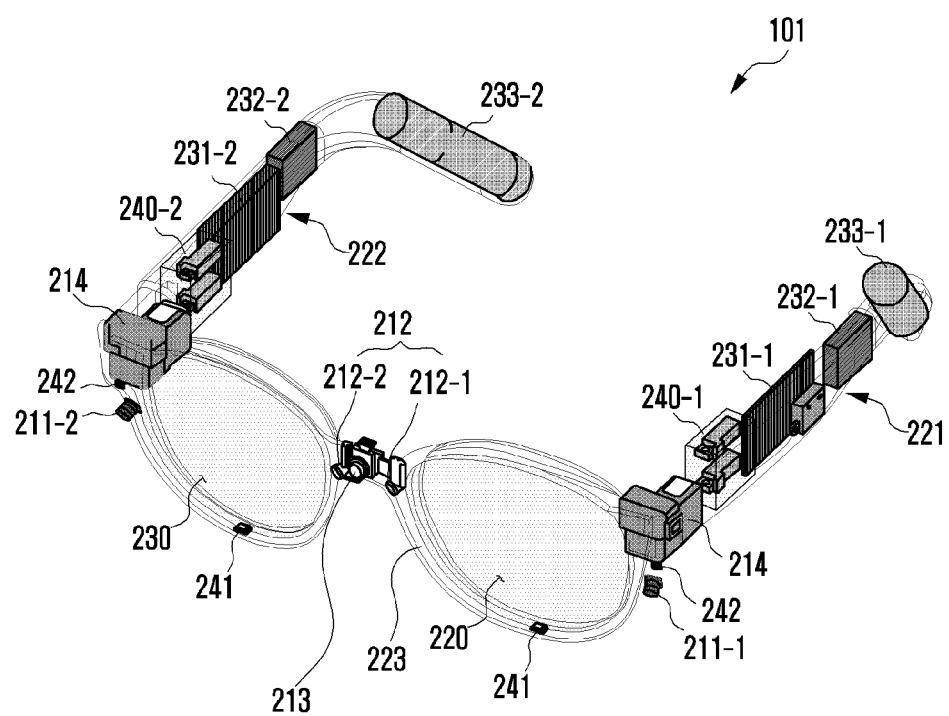
FIG. 2 is a configuration view of an electronic device including a plurality of cameras according to an embodiment of the disclosure.

FIG. 2 is an overall configuration view of an electronic device (e.g., the electronic device 101 of FIG. 1) including a plurality of cameras according to an embodiment of the disclosure.

In various embodiments, the electronic device 101 may be worn on a user's head and provide an image related to an augmented reality service to the user. According to the embodiment, the electronic device 101 may provide an augmented reality service in which at least one virtual object is output so as to overlap an area determined to be the user's field of view (FoV). For example, the area determined to be the user's field of view is an area determined to be perceivable through the electronic device 101 by the user wearing the electronic device 101, and is an area that includes all or at least a portion of a display module of the electronic device 101 (e.g., the display module 160 of FIG. 1). According to the embodiment, the electronic device 101 may include a plurality of glasses (e.g., a first glass 220 and/or a second glass 230) corresponding to both eyes (e.g., left and/or right eyes) of the user. The plurality of glasses may include at least a portion of a display module (e.g., the display module 160 of FIG. 1). For example, the electronic device 101 is configured in the form of at least one of glasses, goggles, a helmet, or a hat, but is not limited thereto.

Referring to FIG. 2, the electronic device 101 according to the embodiment may include at least one of a display module 214 (e.g., the display module 160 of FIG. 1), a camera module (e.g., the camera module 180 of FIG. 1), an audio module (e.g., the audio module 170 of FIG. 1), a first support 221, or a second support 222. According to the embodiment, the display module 160 may include at least one of a first display (e.g., the first glass 220) or a second display (e.g., the second glass 230). According to the embodiment, at least one camera may include a front camera 213 configured to photograph an image that is in response to at least one of the user's field of view (FoV) or measure a distance to an object; an eye tracking camera 212 configured to identify at least one of the user's gaze direction, or a gesture camera (211-1, 211-2) configured to recognize a predetermined space. For example, the front camera 213 photographs a front direction of the electronic device 101, and the eye tracking camera 212 may photograph a direction opposite to the photographing direction of the front camera 213. For example, the eye tracking camera 212 at least partially photographs both eyes of the user. According to the embodiment, at least one of the first support 221 or the second support 222 may include at least one of a printed circuit board (PCB) 231-1 and 231-2, a speaker 232-1 and 232-2, or a battery 233-1 and 233-2.

According to the embodiment, the display module 160 (e.g., the display module 214 of FIG. 2) may be disposed on a main body 223 of the electronic device 101 and may include at least one of a light-concentrating lens (not illustrated) or a transparent waveguide (not illustrated) in a glass (e.g., the first glass 220 and the second glass 230). For example, the transparent waveguide is located at least partially in a portion of the glass. According to the embodiment, light emitted by the display module 160 may be incident on one end of the glass through the first glass 220 and the second glass 230, and the incident light may be transmitted to the user through the waveguide formed in the glass. The waveguide may be made of glass, plastic, or polymer, and may include a nanopattern formed on one surface inside or outside the waveguide, for example, a polygonal or curved grating structure. According to the embodiment, the incident light may be propagated or reflected inside the waveguide by the nanopattern and provided to the user. According to the embodiment, the waveguide may include at least one of at least one diffractive element (e.g., a diffractive optical element (DOE) or a holographic optical element (HOE)) or a reflective element (e.g., a reflective mirror). According to the embodiment, the waveguide may guide a display light emitted from a light source to the user's eyes by means of at least one diffractive element or reflective element.

Referring to FIG. 2, the first support 221 and/or the second support 222 may include the printed circuit boards 231-1 and 231-2 configured to transmit an electrical signal to respective components of the electronic device 101, the speaker 232-1 and 232-2 configured to output an audio signal, the battery 233-1 and 233-2, and/or a hinge unit 240-1 and 240-2 configured to at least partially couple to the main body 223 of the electronic device 101. According to the embodiment, the speaker 232-1 and 232-2 may include a first speaker 232-1 configured to transmit an audio signal to the user's left ear and a second speaker 232-2 configured to transmit an audio signal to the user's right ear. The speaker 232-1 and 232-2 may be included in the audio module 170 of FIG. 1. According to the embodiment, the electronic device 101 may have a plurality of batteries 233-1 and 233-2, and may provide power to the printed circuit board 231-1 and 231-2 through a power management module (e.g., the power management module 188 of FIG. 1).

Referring to FIG. 2, the electronic device 101 may include a microphone 241 configured to receive the user's voice and ambient sound. For example, the microphone 241 is included in the audio module 170 of FIG. 1. The electronic device 101 may include at least one illumination light-emitting diode (LED) 242 configured to increase an accuracy of at least one camera (e.g., the front camera 213, the eye tracking camera 212, and/or the camera 211-1 and 211-2 for recognizing). For example, the illumination LED 242 is used as an aid to increase an accuracy when photographing the user's pupil with the eye tracking camera 212, and the illumination LED 242 may use an IR LED with infrared wavelengths rather than visible wavelengths. For another example, in case of photographing the user's gesture with the camera 211-1 and 211-2 for recognition, the illumination LED 242 is used as an aid when it is difficult to detect a subject to be photographed due to a dark environment or due to a mixed and reflected light from multiple light sources.

Referring to FIG. 2, the electronic device 101 according to the embodiment may be configured with the main body 223 and the support (e.g., the first support 221 and/or the second support 222), and the main body 223 and the support 221 and 222 may be operatively connected. For example, the main body 223 and the support 221 and 222 are operatively connected through the hinge unit 240-1 and 240-2. The main body 223 may be mounted at least partially on the user's nose, and may include the display module 160 and the camera module (e.g., the camera module 180 of FIG. 1). The support 221 and 222 may include a support member mounted on the user's ears, and may include the first support 221 mounted on the left ear and/or the second support 222 mounted on the right ear. According to the embodiment, first support 221 or the second support 222 may include at least partially the printed circuit board 231-1 and 231-2, the speaker 232-1 and 232-2, and/or the battery 233-1 and 233-2 (e.g., the battery 189 of FIG. 1). The battery may be electrically connected to the power management module (e.g., the power management module 188 of FIG. 1).

According to the embodiment, the display module 160 may include at least one of the first glass 220 or the second glass 230, and may provide visual information to the user through the first glass 220 and the second glass 230. The electronic device 101 may include at least one of the first glass 220 in response to the left eye or the second glass 230 in response to the right eye. According to the embodiment, the display module 160 may include at least one of a display panel or a lens (e.g., glass). For example, the display panel includes a transparent material such as glass or plastic.

According to the embodiment, the display module 160 may be configured with a transparent element, and the user may see through the display module 160 and perceive a real space behind the display module 160. The display module 160 may display a virtual object in at least a portion of the area of the transparent element such that the virtual object appears to the user to be added to at least a portion of the real space. At least one of the first glass 220 or the second glass 230 included in the display module 160 may include a plurality of display panels that are in response to both eyes of the user (e.g., left eye and/or right eye), respectively.

According to the embodiment, the electronic device 101 may include a virtual reality (VR) device (e.g., a virtual reality device). In case that the electronic device 101 is a VR device, the first glass 220 may be a first display module (e.g., the display module 160 of FIG. 1), and the second glass 230 may be a second display module (e.g., the display module 160 of FIG. 1).

According to the embodiment, the virtual object output through the display module 160 may include at least one of information related to an application program running on the electronic device 101 or information related to an external object located in the real space that are in response to an area determined to be in the user's field of view (FoV). For example, the electronic device 101 identifies an external object included in at least a portion which is in response to an area determined to be the user's field of view (FoV) in image information related to the real space acquired through the camera of the electronic device 101 (e.g., the front camera 213). The electronic device 101 may output (or display) the virtual object related to the external object identified in at least a portion of the display area of the electronic device 101 through the area determined to be the user's field of view. The external object may include a thing existing in the real space. According to various embodiments, the display area on which the electronic device 101 displays the virtual object may include a portion of the display module (the display module 160 in FIG. 1), (e.g., at least a portion of the display panel). According to the embodiment, the display area may be an area in response to at least a portion of at least one of the first glass 220 or the second glass 230.

According to the embodiment, the electronic device 101 may include the front camera 213 (e.g., red-green-blue (RGB) camera) configured to at least one of photograph an image in response to the user's field of view (FoV) or measure a distance to an object, at least one of the eye tracking camera 212 configured to identify the user's gaze direction, or the camera 211-1 and 211-2 configured to recognize a predetermined space (e.g., a gesture camera). According to the embodiment, the electronic device 101 may use the front camera 213 to measure a distance to an object located in the front direction of the electronic device 101. According to the embodiment, the electronic device 101 may have a plurality of eye tracking cameras 212 disposed in response to both eyes of the user. For example, the eye tracking camera 212 photographs a direction opposite to the photographing direction of the front camera 213. The eye tracking camera 212 may detect the user's gaze direction (e.g., motion of pupils). For example, the eye tracking camera 212 includes a first eye tracking camera 212-1 configured to track a gaze direction of the user's left eye, and a second eye tracking camera 212-2 configured to track a gaze direction of the user's right eye. According to the embodiment, the electronic device 101 may use the camera 211-1 and 211-2 for recognition to detect the user gesture within a predetermined distance (e.g., a predetermined space). For example, the camera 211-1 and 211-2 for recognizing is configured to be plural, and may be disposed on either side of the electronic device 101. The electronic device 101 may use the at least one camera to detect the eye corresponding to at least one of the primary eye or the secondary eye from among at least one of the left eye or the right eye. For example, the electronic device 101 detects an eye corresponding to at least one of the primary eye or the secondary eye on the basis of the user's gaze direction to an external object or virtual object.

According to the embodiment, the front camera 213 may include a high-resolution camera, such as a high resolution (HR) camera and/or a photo video (PV) camera. According to the embodiment, the eye tracking camera 212 may detect the user's pupils to track the gaze direction, and may be utilized to shift the center of the virtual image in response to the gaze direction. For example, the eye tracking camera 212 is divided into the first eye tracking camera 212-1 that is in response to the left eye and the second eye tracking camera 212-2 that is in response to the right eye, and the cameras may have substantially the same performance and/or dimensions. According to the embodiment, the camera 211-1 and 211-2 for recognizing may be used to detect a user's hand (gesture) and/or recognize a space, and may include a global shutter (GS) camera. For example, the camera 211-1 and 211-2 for recognizing includes the GS camera with low screen drag, such as a rolling shutter (RS) camera, to detect and track at least one of fast hand gestures or fine motions such as fingers.

According to the embodiment, the electronic device 101 may display the virtual object related to the augmented reality service together on the basis of the image information related to the real space acquired through the camera of the electronic device 101 (e.g., the camera module 180 of FIG. 1). According to the embodiment, the electronic device 101 may display the virtual object on the basis of the display modules disposed in response to both eyes of the user, such as the first display module (e.g., the first glass 220) in response to the left eye, and/or the second display module (e.g., the second glass 230) in response to the right eye. According to the embodiment, the electronic device 101 may display the virtual object on the basis of predetermined setting information (e.g., resolution, frame rate, brightness, and/or display area).

According to the embodiment, the electronic device 101 may operate a first display panel included in the first glass 220 and a second display panel included in the second glass 230 as independent components. For example, the electronic device 101 determines display performance of the first display panel on the basis of first setting information, and may determine display performance of the second display panel on the basis of second setting information.

The number and position of at least one camera (e.g., the front camera 213, the eye tracking camera 212, and/or the camera for recognizing 211-1 and 211-2) included in the electronic device 101 illustrated in FIG. 2 may be not limited. For example, the number and position of at least one camera (e.g., the front camera 213, the eye tracking camera 212, and/or the camera for recognizing 211-1 and 211-2) vary on the basis of the form (e.g., shape or size) of the electronic device 101.

Figure 3:
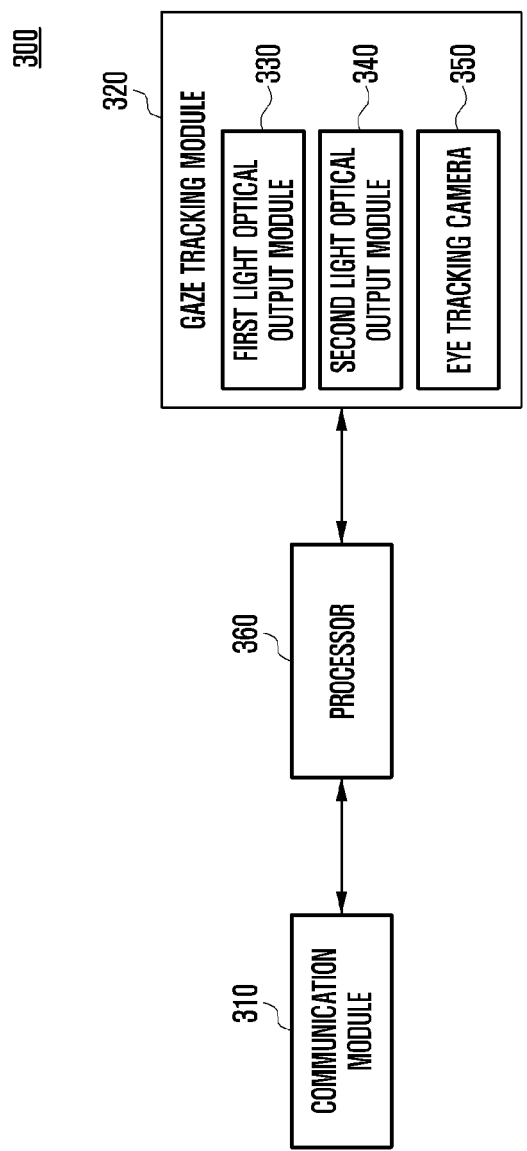
FIG. 3 is a block diagram of an electronic device according to an embodiment of the disclosure.

FIG. 3 is a block diagram of an electronic device according to an embodiment of the disclosure.

Referring to FIG. 3, an electronic device 300 (e.g., the electronic device 101 of FIG. 1 or the electronic device 101 of FIG. 2) may include a communication module 310, a gaze tracking module 320, and a processor 360.

According to various embodiments, the communication module 310 may include software and/or hardware modules (e.g., a communication processor (CP)) for wirelessly communicating with a network (e.g., the first network 198 or second network 199 of FIG. 1) or an external electronic device (e.g., the electronic device 102, electronic device 104, or server 108 of FIG. 1), and may include at least some of the configurations and/or functions of the communication module 190 of FIG. 1. The communication module 310 may communicate with the external electronic device through a wireless communication network (e.g., the first network 198 or second network 199 of FIG. 1). According to various embodiments, the communication module 310 may transmit data provided by other components of the electronic device 300 (e.g., the processor 360) to the external electronic device, or receive data from the external electronic device and provide data to other components of the electronic device 300.

According to various embodiments, the gaze tracking module 320 may include a first light optical output module 330, a second light optical output module 340, and an eye tracking camera 350 (e.g., the eye tracking camera 212 of FIG. 2).

According to various embodiments, the first light optical output module 330 may output a first light. The first light optical output module 330 may include at least some of the configurations and/or functions of the illumination LED 242 of FIG. 2. The first light may be, for example, a structured light having a predetermined pattern. According to various embodiments, the first light optical output module 330 may output the structured light in which various patterns are formed, such as a pattern in which a plurality of light spots form a particular shape, a grid pattern, or a concentric pattern. According to various embodiments, the first light optical output module 330 may output the first light to the user's eyes. According to various embodiments, the first light optical output module 330 may output at least one of visible light or infrared light.

According to various embodiments, the second light optical output module 340 may output a second light. The second light optical output module 340 may include at least some of the configurations and/or functions of the illumination LED 242 of FIG. 2. The second light may be, for example, at least one of visible light or infrared light. According to various embodiments, the second light output from the second light optical output module 340 may have a greater amount of light compared to the first light output from the first light optical output module 330. According to various embodiments, the second light optical output module 340 may output the second light to the user's eyes.

According to various embodiments, the eye tracking camera 350 may photograph at least portion of the user's eyes. The eye tracking camera 350 may include at least some of the configurations and/or functions of the eye tracking camera 212 of FIG. 2. According to the embodiment, the eye tracking camera 350 may photograph at least a portion of the user's eyes by receiving light reflected by the user's eyes from natural light or an external light source. According to various embodiments, the eye tracking camera 350 may create a first image by receiving light reflected by the user's eyes from the first light output from the first light optical output module 330. According to various embodiments, the eye tracking camera 350 may create a second image by receiving light reflected from the user's eyes by the second light output from the second light optical output module 340.

According to various embodiments, the processor 360 may process data in the electronic device 300, may control at least one other component related to the functions of the electronic device 300, and may perform data processing and computations that are necessary to perform the functions. The processor 360 may include at least some of the configurations and/or functions of the processor 120 of FIG. 1. The processor 360 may be electrically and/or functionally connected to components of the electronic device 300, such as the communication module 310 and the gaze tracking module 320. According to various embodiments, the processor 360 is not limited to the data processing functions that may be implemented in the electronic device 300, but the disclosure will be described in terms of tracking the user's gaze and outputting AR images to provide AR services.

According to various embodiments, the processor 360 may control the first light optical output module 330 and the second light optical output module 340 to alternately output the first light and the second light. The processor 360 may alternately output, for example, the first light and the second light at a specific period. According to various embodiments, the processor 360 may output the first light at a first time point and output the second light at a second time point. According to the embodiment, the processor 360 may blink the first light on the basis of a specific frequency and blink the second light on the basis of the same frequency in a phase opposite to the blinking of the first light. For example, the processor 360 controls the first light optical output module 330 and the second light optical output module 340 to alternately output the first light and the second light, or to output the first light and the second light in a designated pattern (or number of times) or at a designated rate.

According to various embodiments, the processor 360 may create the first image by receiving the first light. According to various embodiments, the first image may be an image in which a portion of the user's eyes (e.g., the user's pupils) are irradiated with the first light, which is a structured light. According to the embodiment, the first light is a structured light and may have an insufficient amount of light relative to the second light to fully identify the eyes. Therefore, the first image created by receiving the first light may include only a shape reflected by the structured light. According to various embodiments, the processor 360 may control the eye tracking camera 350 to accumulate image data receiving the first light blinking at a specific period to create the first image. According to one embodiment, the processor 360 may synchronize a blink period of the first light optical output module 330 and the second light optical output module 340 with a light receiving light period of the eye tracking camera 350 in order to accumulate image data of light (e.g., the first light) that blinks at a specific period.

According to various embodiments, the processor 360 may create the second image by receiving the second light. According to various embodiments, the second image may be an image in which a portion of the user's eyes (e.g., the user's pupils) are irradiated with the second light. According to the embodiment, the second light may not be structured and/or patterned light, and may have a sufficient amount of light to fully identify the eye relative to the first light. Therefore, the second image created by receiving the second light may include a shape for at least a portion of the eye, or a shape for the eye and surroundings thereof. According to various embodiments, the processor 360 may control the eye tracking camera 350 to accumulate image data from receiving the second light that blinks at a specific period to create the second image. According to the embodiment, processor 360 may synchronize a blink period of the first light optical output module 330 and the second light optical output module 340 with a light receiving period of eye tracking camera 350 in order to accumulate image data of light (e.g., the second light) that blinks at a specific period. According to various embodiments, the processor 360 may control at least one of the first light optical output module 330 or the second light optical output module 340 to operate the first light optical output module 330 and the second light optical output module 340 only when a gaze track is performed. For example, the gaze track operation of the processor 360 may be performed continuously or may be performed at a predetermined time interval. In this case, at least one of the first light optical output module 330 or the second light optical output module 340 may be operated only during the time when the light receiving operation of the eye tracking camera 350 is performed.

According to various embodiments, processor 360 may synthesize the first image and the second image to create a third image. According to various embodiments, the first image and the second image may be an image photographed by the single eye tracking camera 212, or may be two images photographed with respect to the same position (or the same FOV). In addition, the first image may be an image that includes only the shape of the structured light, and the second image may be an image that includes only the shape of the eye or surroundings thereof including the eye. The processor 360 may synthesize the first image and the second image to create the third image, which is a synthesized image of structured light in the shape of the eyes.

According to various embodiments, the processor 360 may detect a gaze direction on the basis of the third image. According to the embodiment, the processor 360 may analyze the third image and detect the gaze direction by means of a gaze track algorithm stored in a memory (e.g., the memory 130 of FIG. 1). According to the embodiment, the processor 360 may detect a position of the eyes, a position of the structured light (e.g., the first light), and a position of pupils on the basis of the third image. For example, the processor 360 calculates coordinates (e.g., a first coordinate) for the position of the user's pupils on the basis of relative positions of the eyes, the structured light (e.g., the first light), and the pupils. According to various embodiments, processor 360 may detect the user's gaze direction on the basis of at least one of the first coordinate or a variation of the first coordinate.

According to various embodiments, the processor 360 may correct the detected gaze direction on the basis of a variation of the second image. According to various embodiments, the processor 360 may calculate coordinate values (e.g., second coordinate values) for the position of the eyes on the basis of the second image. According to various embodiments, the processor 360 may detect the position of the eyes on the basis of the second coordinate values. According to various embodiments, the processor 360 may calculate a wearing position of the electronic device 300 on the basis of the second coordinate values. For example, in case that the electronic device 300 is worn by the user, the second coordinate values calculated by means of the second image may be different depending on the wearing position. The memory (e.g., the memory 130 of FIG. 1) may preset certain values as default values for the second coordinate values for the wearing position of the electronic device 300, and the processor 360 may calculate the variation of the wearing position by means of the second coordinate values varying from the preset default values or the variation of the second coordinate values over time. According to various embodiments, the processor 360 may be in the process of continuously detecting gaze direction and may use the variation in the second coordinate values to correct the first coordinate values with respect to the position of the pupils. According to various embodiments, the processor 360 may correct the detected gaze direction on the basis of the second coordinate values or the variation in the second coordinate values.

According to the embodiment, the processor 360 may control the first light output to be performed after the second light output. For example, the second image created by receiving the second light is analyzed to detect whether the user is wearing the electronic device 300. According to one embodiment, the processor 360 may calculate the wearing position of the electronic device 300 by means of the second image, and may operate the first light optical output module 330 when the position of the electronic device 300 is determined to be a case of being worn by the user.

According to various embodiments, processor 360 may perform to recognize the pupils by means of the second image. According to one embodiment, the processor 360 may at least one of detect or analyze an area of the pupils included in the second image using an algorithm stored in the memory (e.g., the memory 130 of FIG. 1), and may recognize a specific pattern of the pupils.

According to various embodiments, the processor 360 may transmit at least one of the created first image, second image, or third image to an external electronic device (e.g., the electronic device 102 of FIG. 1), and the external electronic device may receive data resulting from an analysis using at least one of the first image, second image, or third image. For example, the processor 360 receives data about the gaze direction from the external electronic device or data relating to whether the pupils are recognized.

Although not illustrated in FIG. 3, according to various embodiments, the electronic device 300 may include a front camera capable of acquiring a front image (e.g., the front camera 213 of FIG. 2 or the gesture camera 211-1 and 211-2 for recognizing a predetermined space).

Figure 4:
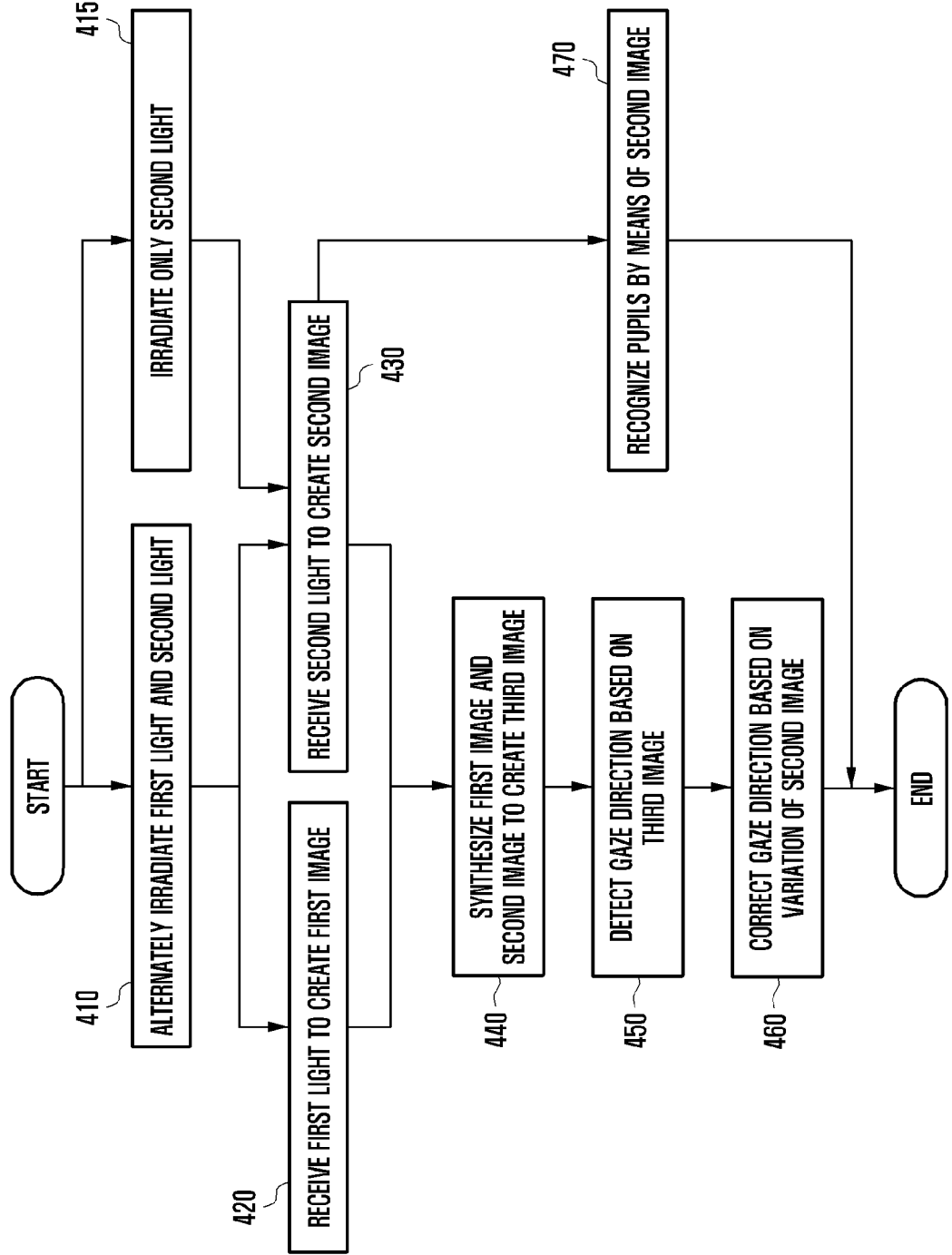
FIG. 4 is a flowchart illustrating an operation in which an electronic device detects a gaze direction according to an embodiment of the disclosure.

FIG. 4 is a flowchart illustrating an operation in which the electronic device detects a gaze direction according to an embodiment of the disclosure.

Referring to FIG. 4, each operation of the electronic device (e.g., the electronic device 300 of FIG. 3) that detects the gaze direction may be described by each of the operations of a processor (e.g., the processor 360 of FIG. 3) included in the electronic device 300. According to various embodiments, the processor 360 may perform operation 415 to control the second light optical output module (e.g., the second light optical output module 340 of FIG. 3) to irradiate only the second light when performing the operation of recognizing the pupils, and may perform operation 410 to control the first light optical output module (e.g., the first light optical output module 330 of FIG. 3) and the second light optical output module (e.g., the second light optical output module 340 of FIG. 3) when performing the operation of detecting the user's gaze direction. According to the embodiment, the processor 360 may perform operation 410 to control the first light optical output module 330 and the second light optical output module 340 to alternately output the first light and the second light in case of simultaneously performing recognizing the pupils and detecting the gaze direction.

With reference to operation 410, the processor 360 according to the embodiment may control the first light optical output module (e.g., the first light optical output module 330 of FIG. 3) and the second light optical output module (e.g., the second light optical output module 340 of FIG. 3) to alternately output the first light and the second light. The processor 360 may alternately output, for example, the first light and the second light at a specific period. According to various embodiments, the processor 360 may output the first light at a first time point and output the second light at a second time point. According to the embodiment, the processor 360 may blink the first light on the basis of a specific frequency and blink the second light on the basis of the same frequency in a phase opposite to the blinking of the first light. For example, the processor 360 alternately outputs the first light and the second light or output the first light and the second light in a designated pattern.

With reference to operation 415, the processor 360 according to the embodiment may control the second light optical output module (e.g., the second light optical output module 340 of FIG. 3) to output the second light. In this case, the first light optical output module (e.g., the first light optical output module 330 in FIG. 3) may be controlled to not output the first light, thereby only outputting the second light. According to various embodiments, the processor 360 may determine whether the gaze track is required, and in case that the gaze track is not required, that is, there is no need to detect the gaze direction, only the second light may be irradiated. According to the embodiment, the processor 360 may control the second light optical output module 340 to irradiate only the second light in case that the processor 360 performs only the pupil's recognition function. In this case, the processor 360 may blink or continuously output the second light.

With reference to operation 420, the processor 360 according to the embodiment may create the first image by receiving the first light. According to various embodiments, the first image may be an image in which a portion of the user's eyes (e.g., the user's pupils) is irradiated with the first light that is the structured light. According to the embodiment, the first light is the structured light and may have an insufficient amount of light relative to the second light to fully identify the eye. Therefore, the first image created by receiving the first light may include only the shape reflected by the structured light. According to various embodiments, the processor 360 may control the eye tracking camera (e.g., the eye tracking camera 350 of FIG. 3) to accumulate image data from the first light that blinks at a specific period to create the first image. According to the embodiment, the processor 360 may synchronize a blink period of the first light optical output module 330 and the second light optical output module 340 with a light receiving period of the eye tracking camera 350 in order to accumulate image data of light (e.g., the first light) that blinks at a specific period.

With reference to operation 430, the processor 360 according to the embodiment may create the second image by receiving the second light. According to various embodiments, the second image may be an image in which a portion of the user's eyes (e.g., the user's pupils) is irradiated with the second light. According to the embodiment, the second light may not be structured and/or patterned light, and may have a sufficient amount of light to fully identify the eye relative to the first light. Therefore, the second image created by receiving the second light may include a shape for at least a portion of the eye, or a shape for the eye and surroundings thereof. According to various embodiments, the processor 360 may control the eye tracking camera 350 to accumulate image data from receiving the second light that blinks at a specific period to create the second image. According to the embodiment, the processor 360 may synchronize a blink period of the first light optical output module 330 and the second light optical output module 340 with a light receiving period of eye tracking camera 350 in order to accumulate image data of light (e.g., the second light) that blinks at a specific period. According to various embodiments, the processor 360 may control at least one of the first light optical output module 330 or the second light optical output module 340 to operate the first light optical output module 330 and the second light optical output module 340 only when the gaze track is performed. For example, the gaze track operation of the processor 360 is performed continuously, or may be performed at a predetermined time interval. In this case, at least one of the first light optical output module 330 or the second light optical output module 340 may be operated only during the time when the light receiving operation of the eye tracking camera 350 is performed.

With reference to operation 440, the processor 360 according to the embodiment may synthesize the first image and the second image to create the third image. According to various embodiments, the first image and the second image may be an image photographed by the single eye tracking camera 212, or may be two images photographed with respect to the same position (or the same FOV). In addition, the first image may be an image that includes only the shape of the structured light, and the second image may be an image that includes only the shape of the eye or surroundings thereof including the eye. The processor 360 may synthesize the first image and the second image to create the third image, which is a synthesized image of structured light in the shape of the eyes.

With reference to operation 450, the processor 360 according to the embodiment may detect the gaze direction on the basis of the third image. According to the embodiment, the processor 360 may analyze the third image and detect the gaze direction by means of a gaze track algorithm stored in a memory (e.g., the memory 130 of FIG. 1). According to the embodiment, the processor 360 may detect a position of the eyes, a position of the structured light (e.g., the first light), and a position of pupils on the basis of the third image. For example, the processor 360 calculates coordinates (e.g., a first coordinate) for the position of the user's pupils on the basis of relative positions of the eyes, the structured light (e.g., the first light), and the pupils. According to various embodiments, processor 360 may detect the user's gaze direction on the basis of at least one of the first coordinate or a variation of the first coordinate.

With reference to operation 460, the processor 360 according to the embodiment may correct the detected gaze direction on the basis of the variation of the second image. According to various embodiments, the processor 360 may calculate coordinate values (e.g., second coordinate values) for the position of the eyes on the basis of the second image. According to various embodiments, the processor 360 may detect the position of the eyes on the basis of the second coordinate values. According to various embodiments, the processor 360 may calculate a wearing position of the electronic device 300 on the basis of the second coordinate values. For example, in case that the electronic device 300 is worn by the user, the second coordinate values calculated by means of the second image may be different depending on the wearing position (or the wearing condition). The memory (e.g., the memory 130 of FIG. 1) may preset certain values as default values for the second coordinate values for the wearing position of the electronic device 300, and the processor 360 may calculate the variation of the wearing position by means of the second coordinate values varying from the preset default values or the variation of the second coordinate values over time. According to various embodiments, the processor 360 may be in the process of continuously detecting gaze direction and may use the variation in the second coordinate values to correct the first coordinate values with respect to the position of the pupils. According to various embodiments, the processor 360 may correct the detected gaze direction on the basis of the second coordinate values or the variation in the second coordinate values.

According to the embodiment, the processor 360 may control the first light output to be performed after the second light output. For example, the second image created by receiving the second light is analyzed to detect whether the user is wearing the electronic device 300. According to one embodiment, the processor 360 may calculate the wearing position of the electronic device 300 by means of the second image, and may operate the first light optical output module 330 when the position of the electronic device 300 is determined to be a case of being worn by the user.

According to the embodiment, the processor 360 may correct the first coordinate values on the basis of motion information on the electronic device 300 detected through at least one sensor included in the electronic device 300 (e.g., the sensor module 176 in FIG. 1). For example, in case that the processor 360 detects a motion of the user wearing the electronic device 300, the processor 360 corrects the first coordinate values on the basis of the motion information of the electronic device 300 or not track the user's gaze direction while the electronic device 300 is moving. According to the embodiment, the processor 360 may detect whether the user is at least one of wearing the electronic device 300 or the condition of wearing the electronic device 300 through at least one sensor (e.g., pressure sensor, proximity sensor, biometric sensor, or acceleration sensor) included in a sensor module (e.g., the sensor module 176 in FIG. 1). For example, the processor 360 detects a motion of the electronic device 300 and whether the user is wearing the electronic device 300 with the acceleration sensor (not illustrated). The wearing condition may mean, for example, a condition in which the user is wearing the electronic device 300 and then takes the device off or changes the wearing position. According to the embodiment, the processor 360 may acquire the second image in case that a change in the user's wearing condition of the electronic device 300 is detected. In addition, the processor 360 may correct the first coordinate values on the basis of the second coordinate values and the variation in the second coordinate values calculated using the acquired second image.

With reference to operation 470, the processor 360 according to the embodiment may perform to recognize the pupils by means of the second image. According to one embodiment, the processor 360 may detect and/or analyze an area of the pupils included in the second image using an algorithm stored in the memory (e.g., the memory 130 of FIG. 1), and may recognize a specific pattern of the pupils.

According to various embodiments, the processor 360 may transmit at least one of the created first image, second image, or third image to an external electronic device (e.g., the electronic device 102 of FIG. 1), and the external electronic device may receive data resulting from an analysis using at least one of the first image, second image, or third image. For example, the processor 360 receives data about the gaze direction from the external electronic device or data relating to whether the pupils are recognized.

Figure 5:
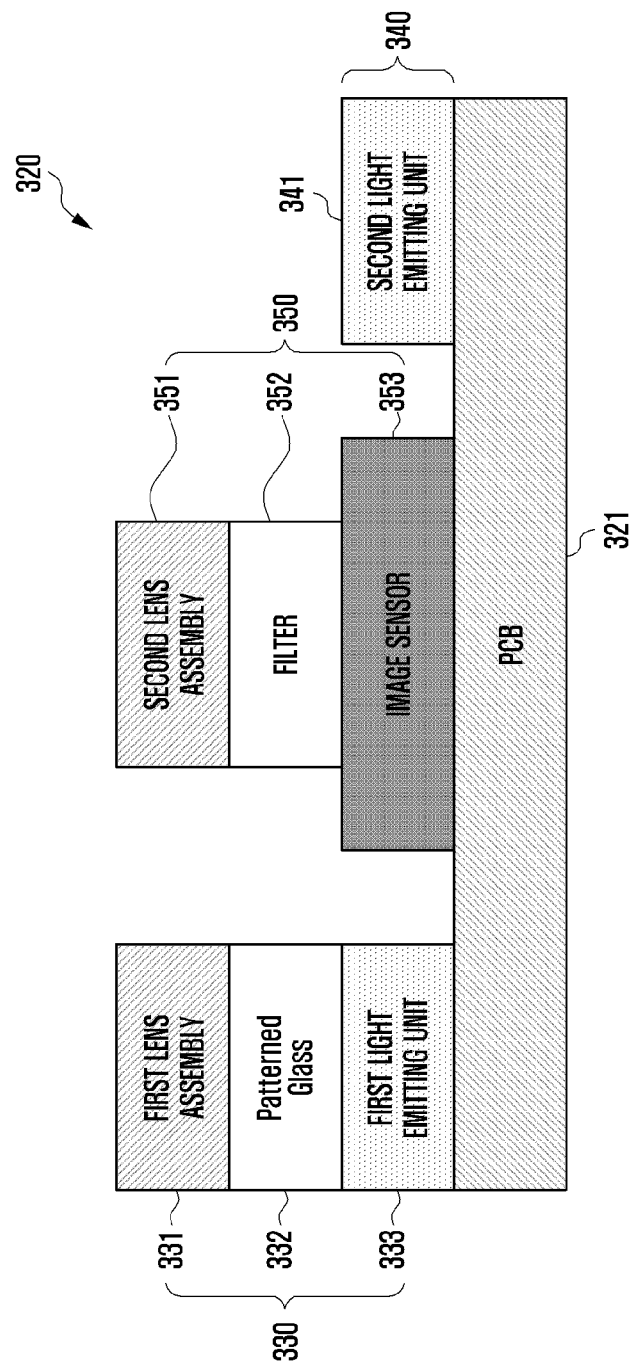
FIG. 5 is an exemplified view of a gaze track module according to an embodiment of the disclosure.

FIG. 5 is an exemplified view of the gaze track module according to an embodiment of the disclosure.

Referring to FIG. 5, the gaze tracking module 320 may include the first light optical output module 330, the second light output module 340, the eye tracking camera 350, and the printed circuit board (PCB) 321. According to various embodiments, the PCB 321 may be connected to a processor (e.g., the processor 360 of FIG. 3) or may be a part of the processor 360 and may be electrically and/or operatively connected to each component of the gaze tracking module 320 (e.g., the first light optical output module 330, the second light optical output module 340, and the eye tracking camera 350).

According to various embodiments, the first light optical output module 330 may include a first lens assembly 331, a patterned glass 332, and a first light emitting unit 333.

According to various embodiments, the first lens assembly 331 may include one or more lenses. The first lens assembly 331 may be configured to provide optical properties of a lens to the light output from the first light optical output module 330. The optical properties may include, for example, field of view (FOV), and/or refractive properties and/or distortion properties. According to the embodiment, the optical properties of the first lens assembly 331 may be a combination of optical properties included in each of the one or more lenses sequentially stacked and included in the first lens assembly 331.

According to various embodiments, the patterned glass 332 may create the structured light by transforming an incident light. According to the embodiment, the light output from the first light emitting unit 333 may be transformed into the structured light (e.g., the first light) while passing through the patterned glass 332. According to the embodiment, the patterned glass 332 may be in the form of a coating that absorbs only specific wavelengths of light applied to a portion of the glass through which light passes. For example, in case that a coating is applied to the remainder of the glass that leaves an area corresponding to a pattern of the structured light, light passing through the patterned glass 332 is transformed into the structured light that includes a shape of the corresponding pattern. According to the embodiment, the patterned glass 332 may be a glass with a different refractive index for each area. Due to a different refractive index in each area, a portion of the light passing through the patterned glass 332 may be superimposed or extinguished and thereby transformed into the structured light with a predetermined pattern.

According to various embodiments, the first light emitting unit 333 may be a light source of the first light. For example, the first light emitting unit 333 outputs light to be transformed into the first light. The first light emitting unit 333 may include at least some of the configurations and/or functions of the illumination LED 242 of FIG. 2. According to the embodiment, the first light emitting unit 333 may output visible light or infrared light.

According to various embodiments, the first light optical output module 330 may output the structured light (e.g., the first light). According to various embodiments, the light emitted from the first light emitting unit 333 may be output by sequentially passing through the patterned glass 332 and the first lens assembly 331. According to the embodiment, the light emitted from the first light emitting unit 333 may be transformed into the structured light while passing through the patterned glass 332. According to one embodiment, the structured light passing through the patterned glass 332 may pass through the first lens assembly 331 to form the first light that includes the optical properties of the first lens assembly 331.

According to various embodiments, a processor located on or electrically and/or operatively connected to the PCB 321 (e.g., the processor 360 of FIG. 3) may control the first light optical output module 330 to output the first light, and may control the first light emitting unit 333 to blink and emit the first light at a specific period.

According to various embodiments, the second light optical output module 340 may include a second light emitting unit 341.

According to various embodiments, the second light emitting unit 341 may be a light source of the second light. For example, the second light emitting unit 341 outputs the second light. The second light emitting unit 341 may include at least some of the configurations and/or functions of the illumination LED 242 of FIG. 2. According to the embodiment, the second light emitting unit 341 may output visible light or infrared light.

According to various embodiments, a processor located on or electrically and/or operatively connected to the PCB 321 (e.g., the processor 360 of FIG. 3) may control the second light optical output module 340 to output the second light, and may control the second light emitting unit 341 to blink and emit the second light at a specific period.

According to various embodiments, the eye tracking camera 350 may include a second lens assembly 351, a filter 352 and an image sensor 353.

According to various embodiments, the second lens assembly 351 may include one or more lenses. The second lens assembly 351 may be configured to provide optical properties of a lens to externally incident light (e.g., first light and/or second light). The optical properties may include, for example, at least one of field of view (FOV), refractive properties, or distortion properties. According to the embodiment, the optical properties of the second lens assembly 351 may be a combination of optical properties included in each of the one or more lenses sequentially stacked and included in the second lens assembly 351. According to the embodiment, the optical properties of the second lens assembly 351 may be the same as the optical properties of the first lens assembly 331.

According to various embodiments, only specific wavelengths of incident light may pass through the filter 352. Light passing through the second lens assembly 351 from the outside and incident on the filter 352 may include light of various wavelengths. For example, natural or external light may be simultaneously incident on the filter 352 along with light reflected by the first light or second light onto the user's eyes. According to various embodiments, at least one of the first light or the second light may include only infrared light, and only light having a wavelength of infrared or near-infrared light may pass through the filter 352.

According to various embodiments, the image sensor 353 may convert light incident through the second lens assembly 351 into an electrical signal. The image sensor 353 may include a plurality of pixels, each of which may include a light receiving element that converts incident light into an electrical signal. The image sensor may be configured with a semiconductor device, for example, such as a charged coupled device (CCD) or a complementary metal-oxide semiconductor (CMOS). According to various embodiments, the image sensor 353 may convert incident light into an electrical signal to create image information. According to various embodiments, binocular image information may be image information (e.g., the first image and/or the second image) created by receiving visible or infrared light (e.g., the first light and/or the second light) reflected from an area including at least one of both eyes of the user or surroundings thereof.

According to the embodiment, some of the first light optical output module 330, second light optical output module 340, or eye tracking camera 350 may be located on a different PCB (not illustrated) than the PCB 321. For example, the first light optical output module 330 and the second light optical output module 340 are located on the PCB 321, and the eye tracking camera 350 may be located on a different PCB (not illustrated).

According to various embodiments, the position of the eye tracking camera 350 may be unrestricted as long as the first light output from the first light optical output module 330 is in a position to receive light reflected from the user and the second light output from the second light optical output module 340 is in a position to receive light reflected from the user.

Figure 6A:
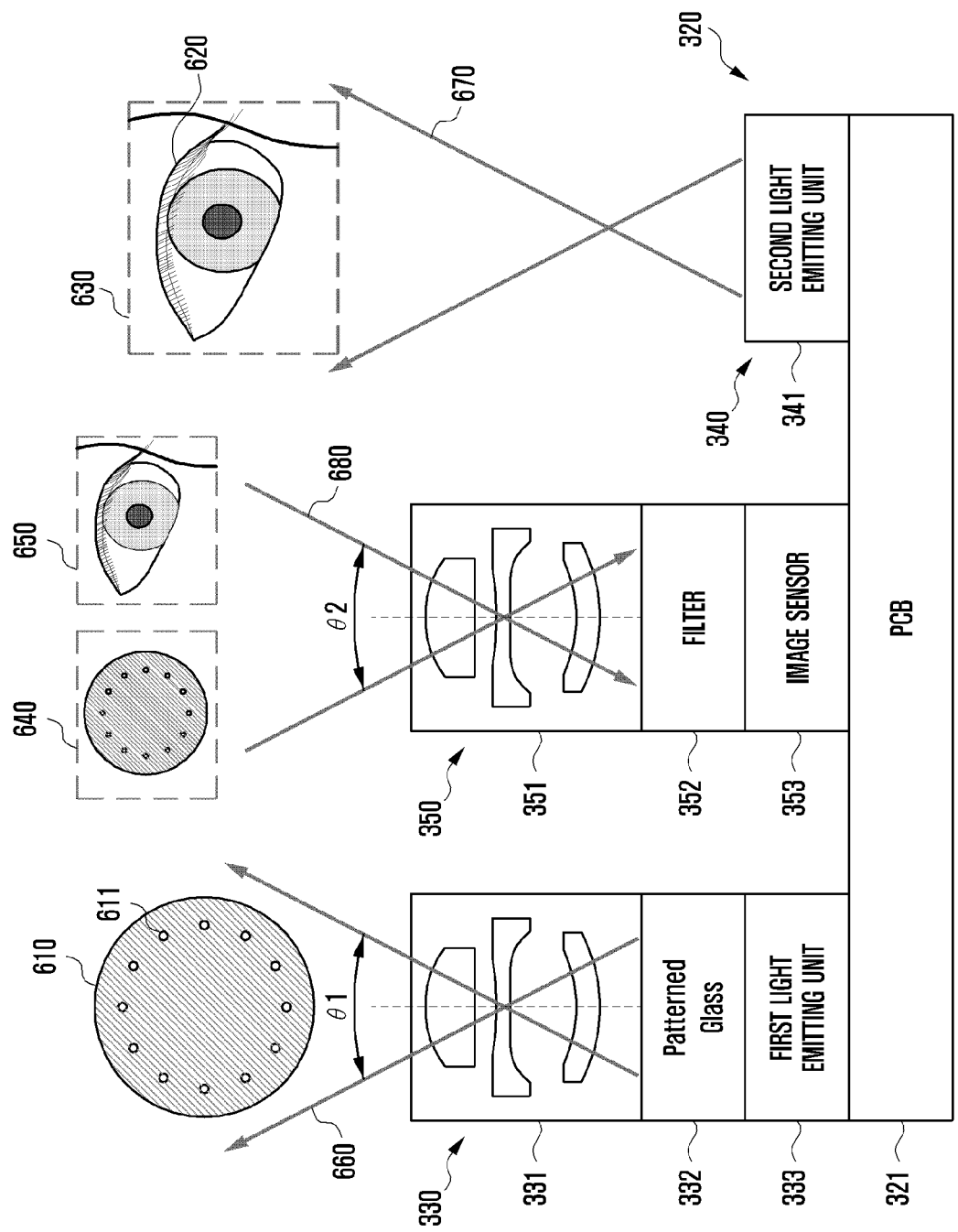
FIGS. 6A and 6B are exemplified views of creating a first image, a second image, and a third image by a gaze tracking module according to various embodiments of the disclosure.
Figure 6B:
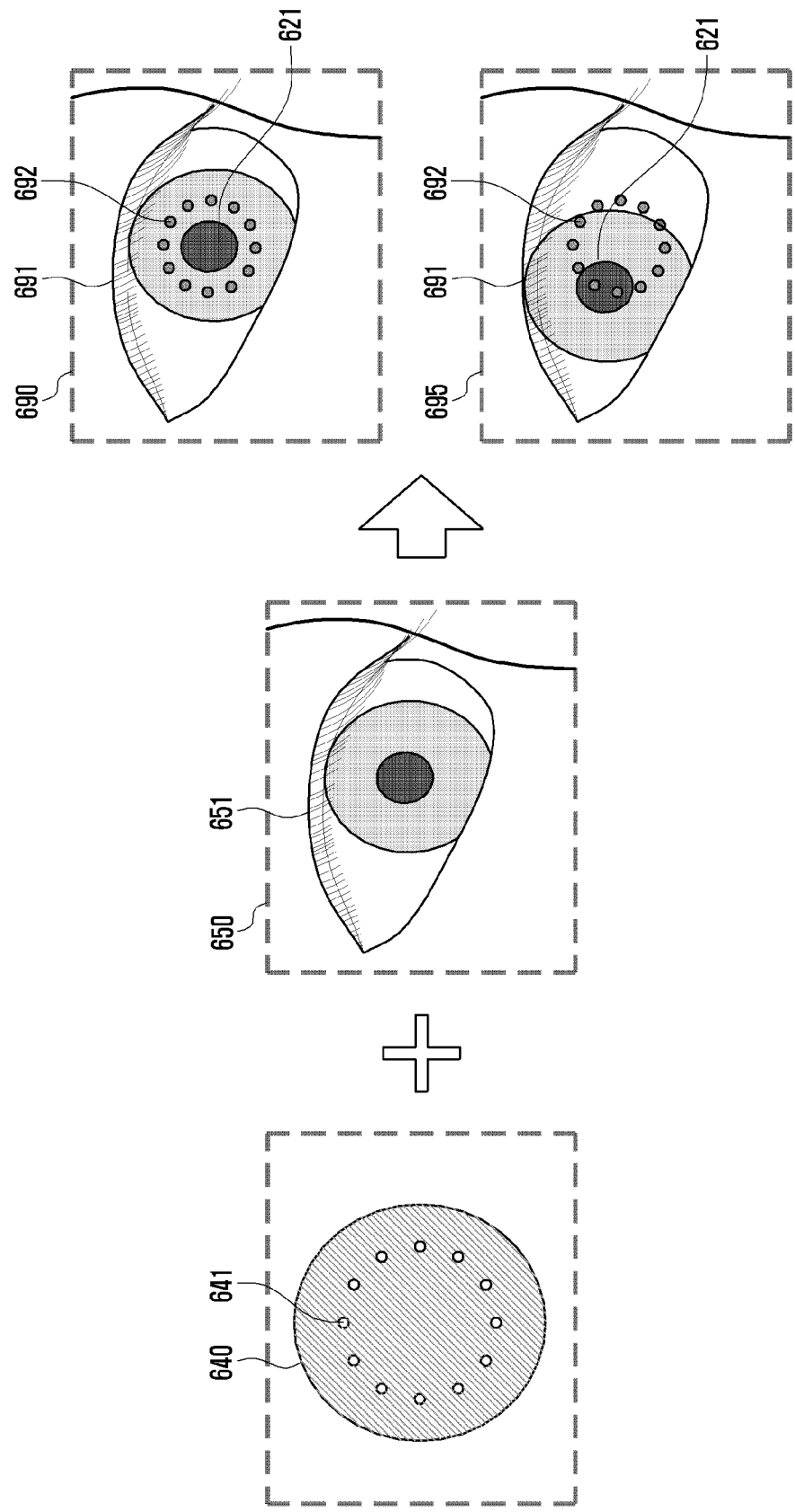

FIGS. 6A and 6B are exemplified views of creating a first image, a second image, and a third image by a gaze tracking module according to various embodiments of the disclosure.

Referring to FIG. 6A, the first light optical output module 330 may output a first light 660. According to various embodiments, the light output from the first light emitting unit 333 may be transformed into the structured light by passing through the patterned glass 332. In addition, the structured light passing through the patterned glass 332 may pass through the first lens assembly 331 and be output as the first light 660. The first light 660 may form a predetermined field of view θ1 while passing through the first lens assembly 331. For example, the field of view θ1 has a value of about 60° to 90°. While not limited to the values that field of view θ1 may have, it may be desirable to form the field of view at an angle that allows irradiation of the first light 660 over a range of areas corresponding to a size of the user's pupil at a distance between the first lens assembly 331 and the user's eyes. Only structured light (e.g., a plurality of light spots 611) may be formed in a first light area 610, which is the size of a typical human pupil or eyeball and formed by outputting the first light 660, and no light may be formed in other portions of the first light area 610 in which the structured light is not formed. For example, the first light area 610 is an example that includes both an area that is not irradiated with light and an area that is irradiated with light, and an area that is actually irradiated with light may be only an area that the light spots 611 are reached.

Referring to FIG. 6A, the second light optical output module 340 may output a second light 670. According to various embodiments, the second light emitting unit 341 may output the second light 670 to irradiate the second light 670 into the user's eyes. According to various embodiments, the second light 670 may have a relatively large amount of light compared to the first light, and a second light area 630 which is formed by outputting the second light 670 may include a position in response to the user's eyes 620.

Referring to FIG. 6A, the eye tracking camera 350 may create the first image 640 by receiving light that reaches the eye tracking camera 350 after the first light 660 is reflected by the user's eyes or user pupils. In addition, the eye tracking camera 350 may create the second image 650 by receiving light that reaches the eye tracking camera 350 after the second light is reflected by the user's eyes. According to various embodiments, each of the first light 660 and the second light 670 may become incident light 680 and be incident on the second lens assembly 351. Then, the first light 660 and second light 670 may pass through a filter 352 such that only light in a particular wavelength band passes through, and the image sensor 353 may receive the light that has passed through the filter 352. According to various embodiments, a processor (e.g., the processor 360 of FIG. 3) may control the first light optical output module 330 and the second light optical output module 340 to alternately irradiate each of the first light 660 and the second light 670 at a predetermined period. For example, the processor 360 controls the first light 660 to blink using a specific frequency, and the second light 670 to blink using the same frequency, but in opposite phase. According to various embodiments, the processor 360 may control the eye tracking camera 350 to control a light receiving period of the image sensor 353, which may be a period in response to the blink frequency of the first light optical output module 330 and the second light optical output module 340. For example, the light receiving period of the image sensor 353 is in response to a sum of the blink frequency of the first light optical output module 330 and the blink frequency of the second light optical output module 340. The image sensor 353 may select the received first light 660 and second light 670 on a periodic basis to create a respective image, and may create the first image 640 using only the first light 660 and the second image 650 using only the second light 670. According to the embodiment, the second lens assembly 351 may form a predetermined field of view θ2. For example, the field of view θ2 has a value of about 60° to 90°. According to the embodiment, the second lens assembly 351 may be designed to have the same optical properties as the first lens assembly 331. For example, the field of views θ1 and θ2 has the same value. While not limited to the values that field of view θ2 may have, the field of view may be formed at an angle at which the first light 660 and the second light 670 are able to be received over a range of areas corresponding to a size of the user's eye at a distance between the second lens assembly 351 and the user's eyes.

Referring to FIG. 6B, a processor (e.g., the processor 360 of FIG. 3) may synthesize the first image 640 and the second image 650 received from the eye tracking camera to create a third image 690. The first image 640 may include only the structured light, for example, in which the plurality of light spots 641 form a predetermined pattern. While the plurality of light spots 641 are not limited to types of patterns, the document describes a circular pattern for convenience. Of the areas of the first image 640, the remaining areas other than the plurality of light spots 641 that are the structured light may not form light. According to various embodiments, the second image 650 may include an eye image 651. The second light 670 may be irradiated over an area including the eyes and surroundings thereof, and may have a sufficient amount of light to identify the eye image 651. According to various embodiments, the first image 640 and the second image 650 may be synthesized to create the third image 690. For example, the processor 360 synthesizes the first image 640 and the second image 650 to create the third image 690. For example, the third image 690 includes an eye image 691 and a shape of structured light 692. The processor 360 may detect a gaze direction by means of the third image 690 and perform a gaze track. According to one embodiment, the processor 360 may analyze an image by means of the third image 690 and detect a gaze direction on the basis of the positions of the pupils 621 and the structured light 692. In the embodiment, when the pupils 621 move, the third image 690 may change on the basis of the motion of the pupils 621, and the processor 360 may detect the changed gaze direction by comparing the changed position of the pupils 621 to the position of the structured light 692 by means of the changed third image 695.

Figure 7:
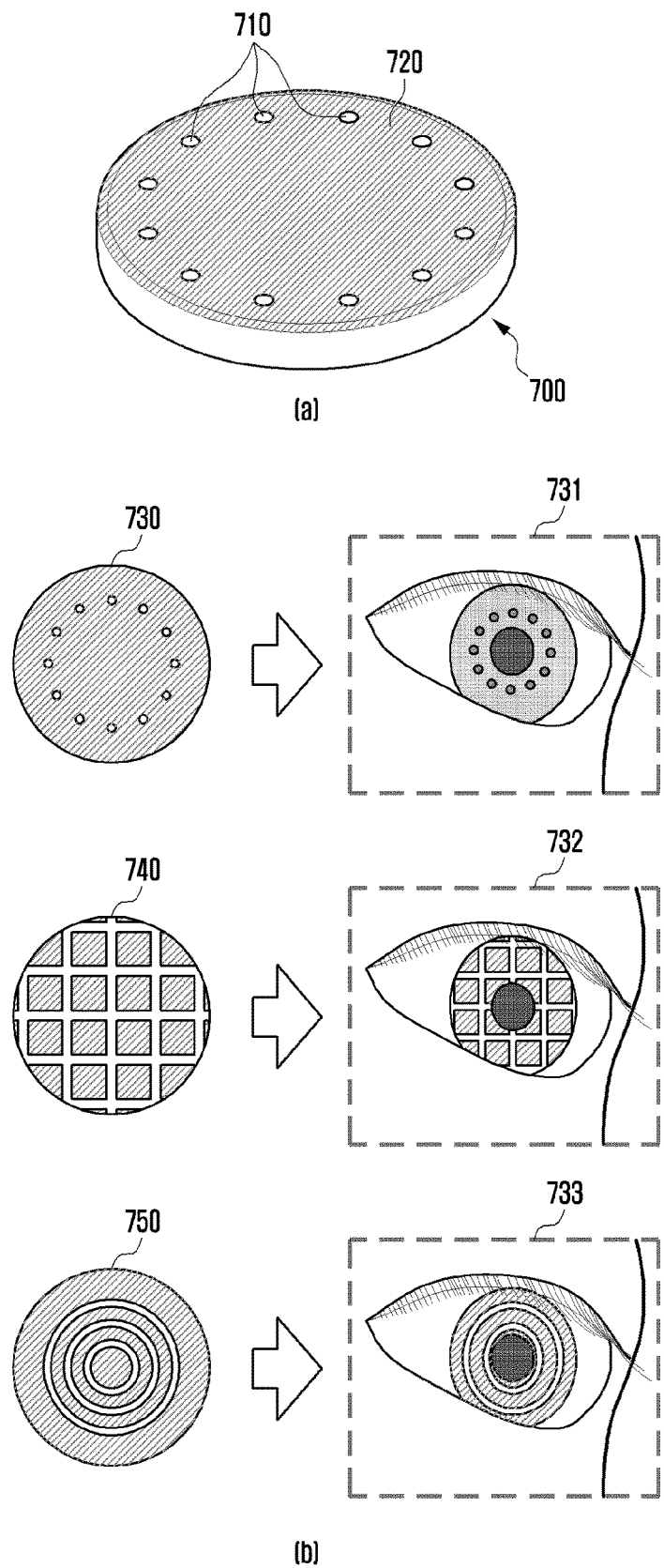
FIG. 7 is an exemplified view of patterned glasses according to an embodiment of the disclosure.

FIG. 7 is an exemplified view of patterned glasses according to an embodiment of the disclosure.

Referring to part (a) of FIG. 7, patterned glass 700 may include a flat plate or lens structure. The patterned glass 700 may be made of a material capable of passing light (e.g., plastic, glass). The patterned glass 700 may transform light through which the patterned glass 700 into structured light (e.g., the first light). According to the embodiment, at least one of the front or rear of the patterned glass 700 may include a transmissive portion 710 through which structured light passes, and a blocking portion 720 which is the remaining area other than the transmissive portion 710. For example, the blocking portion 720 may be formed by applying a material that absorbs specific wavelengths of light to an area corresponding to the blocking portion 720 formed on the front or rear of the patterned glass 700. According to the embodiment, the first light (e.g., the first light 660 in FIG. 6A) may be infrared light, and the material that forms the blocking portion 720 or is applied to the blocking portion 720 may be made of a material that absorbs infrared light. According to the embodiment, the transmissive portion 710 and the blocking portion 720 may be configured with different materials. For example, the transmissive portion 710 is configured with a material through which the first light passes (e.g., plastic or glass), and the blocking portion 720 may be configured with a material through which the first light does not pass (e.g., opaque plastic, polymer, silicone, etc.).

Referring to part (b) of FIG. 7, the transmissive portion 710 and the blocking portion 720 may be formed in various forms. For example, a pattern of the patterned glass 700 is formed in the shape of a plurality of light spots disposed in a circular manner 730, and a pattern of the patterned glass 700 may be formed in an image 731 in which the structured light including the plurality of light spots disposed in a circular manner is irradiated on the user's pupils. According to the embodiment, the pattern of the patterned glass 700 may be formed in the shape 740 that includes a transmissive portion of the lattice pattern to allow the structured light of the lattice pattern to pass through, and the pattern of the patterned glass 700 may be formed in an image 732 in which the structured light of the lattice pattern is irradiated on the user's pupils. According to the embodiment, the pattern of the patterned glasses 700 may be formed in the shape 750 that includes a transmissive portion of the concentric pattern, and the pattern of the patterned glasses 700 may be formed in an image 733 in which the concentric pattern of light is irradiated onto the user's pupils. Furthermore, the pattern of the patterned glass 700 may have various shapes (e.g., diagonal, honeycomb).

Figure 8:
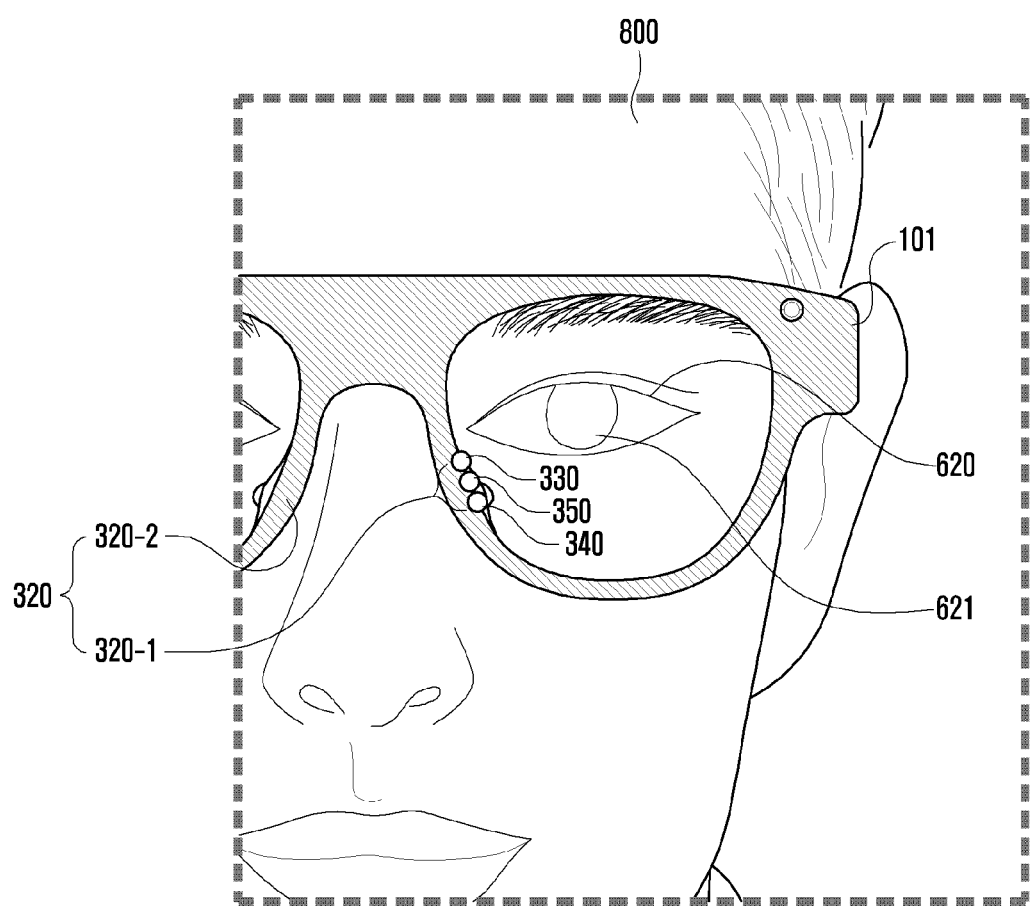
FIG. 8 is an exemplified view of wearing an electronic device according to an embodiment of the disclosure.

FIG. 8 is an exemplified view of wearing the electronic device according to an embodiment of the disclosure.

Referring to FIG. 8, the electronic device 101 may be worn on the face of a user 800. According to various embodiments, the gaze tracking module 320 may include a first gaze tracking module 320-1 and a second gaze tracking module 320-2, corresponding to each of both of the user's eyes. According to the embodiment, the first gaze tracking module 320-1 and the second gaze tracking module 320-2 may be disposed in some area of a frame (e.g., the main body 223 in FIG. 2) at a predetermined distance from both eyes (left eye and right eye) of the user, respectively. With reference to the first gaze tracking module 320-1, the first light optical output module 330, the second light optical output module 340, and the eye tracking camera 350 may be disposed as one module, and a mounted area of the gaze tracking module 320 may be minimized. According to various embodiments, a mounting position of the gaze tracking module 320 may be various. For example, the gaze tracking module 320 is not limited in case that the gaze tracking module 320 is in a position that faces both eyes of the user. In another example, the gaze tracking module 320 is positioned in an area that is not visible when viewing the user 800 wearing the electronic device 101 from the outside of the electronic device 101. According to the embodiment, the first light optical output module 330 may output the first light to the user's pupils 621, and the second light optical output module 340 may output the second light to the user's eyes 620. The eye tracking camera 350 may create the first image and the second image by receiving first light reflected from the user's pupils 621 and the second light reflected from the user's eyes 620.

Figure 9:
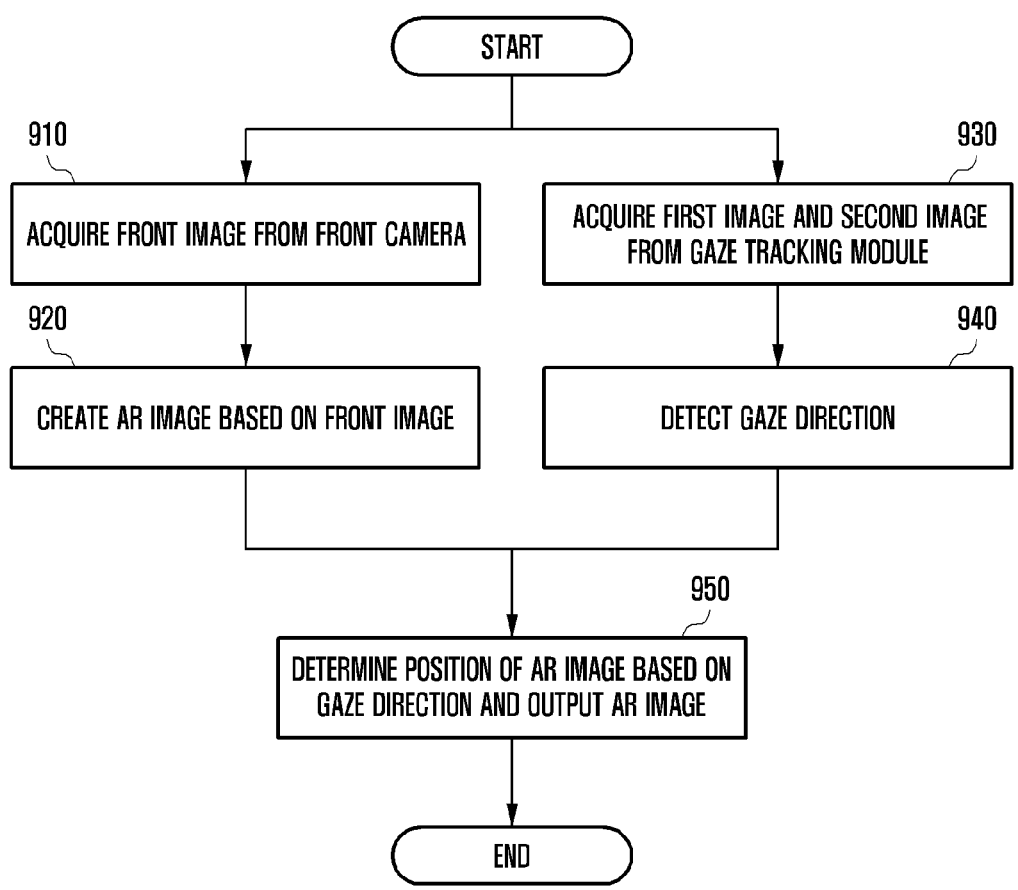
FIG. 9 is a flowchart illustrating an operation in which an electronic device tracks a gaze and outputs an augmented reality (AR) image according to an embodiment of the disclosure.

FIG. 9 is a flowchart illustrating an operation in which the electronic device tracks a gaze and outputs an augmented reality (AR) image according to an embodiment of the disclosure.

Each operation in FIG. 9 may represent each operation of a processor (e.g., the processor 360 in FIG. 3) included in an electronic device (e.g., the electronic device 300 in FIG. 3) for tracking a user's gaze and outputting an AR image.

Referring to FIG. 9, in operation 910, the processor 360 may receive front image information from a front camera (e.g., the front camera 213 of FIG. 2). The front camera 213 may photograph an object present in the front of the electronic device 300, such as the front of the frame (e.g., the main body 223 in FIG. 2), and may create front image information for the photographed image. The processor 360 may recognize an object present in the front of the frame using the front image information, and may track the user's hand or the object present in the front of the frame.

With reference to operation 920, the processor 360 may create an augmented reality (AR) image on the basis of the front image information. The processor 360 may analyze the front image information to recognize an object present in the front, and may create a virtual object in response to the object present in the front. The processor 360 may create an AR image that includes a virtual object. According to another embodiment, operation 920 may be performed on an external electronic device (e.g., the electronic device 102 of FIG. 1). For example, the electronic device 300 transmits a front image acquired from the front camera to an external electronic device through the communication module 310, and receive an AR image on the basis of the front image from the external electronic device.

With reference to operation 930, the processor 360 may acquire the first image and the second image from the gaze tracking module (e.g., the gaze tracking module 320 of FIG. 3). The gaze tracking module 320 may photograph the rear of the electronic device 300, for example, the rear of the frame (e.g., the main body 223 of FIG. 2), and photographs both eyes of the user wearing the electronic device. The processor 360 may instruct the gaze tracking module 320 to alternately irradiate both eyes of the user, including the left eye and the right eye of the user wearing the electronic device 300, with the first light and the second light which are the structured light, and acquire the first image and the second image created by partially photographing both eyes of the user. According to various embodiments, the processor 360 may receive the second light to create the second image. According to various embodiments, the second image may be an image in which a portion of the user's eyes (e.g., the user's pupils) are irradiated with the second light. According to the embodiment, the second light may not be structured and/or patterned light, and may have a sufficient amount of light to fully identify the eyes relative to the first light. Therefore, the second image created by receiving the second light may include a shape for at least a portion of the eye, or a shape for the eye and surroundings thereof. According to various embodiments, the processor 360 may control an eye tracking camera (e.g., the eye tracking camera 350 of FIG. 3) to accumulate image data from receiving a second light that blinks at a specific period to create the second image. According to the embodiment, the processor 360 may synchronize the blink periods of the first light optical output module 330 and the second light optical output module 340 with the light receiving period of the eye tracking camera 350 in order to accumulate image data of light (e.g., the second light) that blinks at a specific period. According to various embodiments, the processor 360 may control at least one of the first light optical output module (e.g., the first light optical output module 330 of FIG. 3) or the second light optical output module (e.g., the second light optical output module 340 of FIG. 3) to operate the first light optical output module 330 and the second light optical output module 340 only when a gaze track is performed. For example, the gaze track operation of the processor 360 is performed continuously, or the gaze track operation may be performed at a predetermined time interval. In this case, at least one of the first light optical output module 330 or the second light optical output module 340 may be operated only during the time when the receiving operation of the eye tracking camera 350 is performed.

With reference to operation 940, the processor 360 may detect a gaze direction on the basis of the first image and the second image. According to various embodiments, the processor 360 may track the motion of the user's pupils using binocular image information. According to various embodiments, the processor 360 may acquire the user's gaze direction by tracking the motion of the user's pupils with the binocular image information. According to various embodiments, processor 360 may synthesize the first image and the second image to create the third image. According to various embodiments, the first image and the second image may be images photographed by the single eye tracking camera 350, or may be two images photographed with respect to substantially the same location. Additionally, the first image may be an image that includes only the shape of the structured light, and the second image may be an image that includes only the shape of the eye or the surroundings thereof, including the eye. The processor 360 may synthesize the first image and the second image to create the third image in which the structured light is synthesized in the shape of the eye. According to various embodiments, the processor 360 may detect a gaze direction on the basis of the third image. According to the embodiment, the processor 360 may analyze the third image and detect the gaze direction by means of a gaze track algorithm stored in a memory (e.g., the memory 130 of FIG. 1). According to the embodiment, the processor 360 may detect the position of the eyes, the position of the structured light (e.g., the first light), and the position of the pupils on the basis of the third image. For example, the processor 360 calculates coordinates (e.g., a first coordinate) for the position of the user's pupils on the basis of relative positions of the eyes, the structured light (e.g., the first light), and the pupils. According to various embodiments, processor 360 may detect the user's gaze direction on the basis of at least one of the first coordinate or a variation of the first coordinate. According to various embodiments, the processor 360 may correct the detected gaze direction on the basis of a variation of the second image. According to various embodiments, the processor 360 may calculate coordinate values (e.g., second coordinate values) for the position of the eyes on the basis of the second image. According to various embodiments, the processor 360 may detect the position of the eyes on the basis of the second coordinate values. According to various embodiments, the processor 360 may calculate a wearing position of the electronic device 300 on the basis of the second coordinate values. For example, in case that the electronic device 300 is worn by the user, the second coordinate values calculated by means of the second image may be different depending on the wearing position. The memory (e.g., the memory 130 of FIG. 1) may preset certain values as default values for the second coordinate values for the wearing position of the electronic device 300, and the processor 360 may calculate the variation of the wearing position by means of the second coordinate values varying from the preset default values or the variation of the second coordinate values over time. According to various embodiments, the processor 360 may be in the process of continuously detecting gaze direction and may use the variation in the second coordinate values to correct the first coordinate values with respect to the position of the pupils. According to various embodiments, the processor 360 may correct the detected gaze direction on the basis of the second coordinate values or the variation in the second coordinate values. According to the embodiment, the processor 360 may correct the first coordinate values on the basis of motion information on the electronic device 300 detected through at least one sensor included in the electronic device 300 (e.g., the sensor module 176 in FIG. 1). For example, in case that the processor 360 detects a motion of the user wearing the electronic device 300, the processor 360 may correct the first coordinate values on the basis of the motion information of the electronic device 300 or may not track the user's gaze direction while the electronic device 300 is moving. According to the embodiment, the processor 360 may detect whether the user is wearing the electronic device 300 and/or the condition of wearing the electronic device 300 through at least one sensor (e.g., pressure sensor, proximity sensor, biometric sensor, or acceleration sensor) included in a sensor module (e.g., the sensor module 176 in FIG. 1). For example, the processor 360 detects a motion of the electronic device 300 and whether the user is wearing the electronic device 300 with the acceleration sensor (not illustrated). The wearing condition may mean, for example, a condition in which the user is wearing the electronic device 300 and then takes the device off or changes the wearing position. According to the embodiment, the processor 360 may acquire the second image in case that a change in the user's wearing condition of the electronic device 300 is detected. In addition, the processor 360 may correct the first coordinate values on the basis of the second coordinate values and the variation in the second coordinate values calculated using the acquired second image.

With reference to operation 950, the processor 360 may determine a position of an AR image on the basis of a gaze direction and output the AR image. According to various embodiments, the processor 360 may control a display module (e.g., the display module 214 of FIG. 2) to project light onto a glass module (e.g., the first glass 220 and/or the second glass 230 of FIG. 2) to output an AR image. According to various embodiments, the processor 360 may control the display module 214 to output the created AR image. When the AR image is output from the display module 214 and projected onto the glass module, AR may be implemented by combining the front visible light incident through the glass module with a virtual object included in the AR image.

According to various embodiments, the processor 360 may determine a position of the AR image on the basis of the gaze direction. For example, the processor 360 controls the display module 214 such that the user's gaze direction and the center of the image projected on the glass module (e.g., the first glass 220 and/or the second glass 230 of FIG. 2) are aligned. In the embodiment, the processor 360 may control the display module 214 to adjust a resolution of the AR image corresponding to a predetermined area centered on the user's gaze direction to be higher than the rest of the area. In the embodiment, the processor 360 may output the AR image such that an AR object is positioned in a predetermined area centered on the user's gaze direction. In the embodiment, the processor 360 may change and output a position of the outputted AR image on the basis of the gaze direction. In the embodiment, the processor 360 may configure the user's area of interest on the basis of the gaze direction with respect to the position of the outputted AR image, or may receive input from the user regarding the gaze direction. For example, in case that a gaze is positioned on a designated object for more than a predetermined amount of time, it is identified that input from the user has been received for the corresponding object. In addition, the processor may control the display module in various ways or create the AR image by means of the gaze direction acquired through the binocular image information.

According to the embodiment, the processor 360 may substantially at the same time perform some of operations of creating the AR image by performing operation 910 and operation 920, and some of operations of detecting the user's gaze direction by performing operation 930 and operation 940. For example, the processor 360 detects the user's gaze direction through the gaze tracking module 320 while creating the AR image on the basis of the front image acquired through the front camera.

According to various embodiments, the electronic device 300 may be a virtual reality (VR) device. In this case, the electronic device 300 may display at least a portion of the image data on the basis of data stored in a memory (e.g., the memory 130 in FIG. 1) or data received from an external electronic device (e.g., the electronic device 102 in FIG. 1) through communication module 310 without performing operations 910 and 920 on the basis of the gaze direction detected by performing operations 930 and 940.

An electronic device (e.g., the electronic device 300) according to various embodiments disclosed in the document may include: a main body (e.g., the main body 223); a glass supported by the main body, (e.g., the first glass 220 and/or the second glass 230); a support rotatably connected to the main body (e.g., the first support 221 and/or the second support 222); a first light optical output module (e.g., the first light optical output module 330) configured to irradiate a first light (e.g., the first light 660) that is a structured light (e.g., the structured light 692) toward user's (e.g., the user 800) eyes (e.g., the user's eyes 620) disposed at the rear of the main body; a second light optical output module (e.g., the second light optical output module 340) configured to irradiate a second light (e.g., the second light 670) toward the user's eyes; a camera configured to photograph the user's eyes (e.g., the eye tracking camera 350); and a processor (e.g., the processor 360) operatively connected to the first light optical output module, the second light optical output module, and the camera, in which the processor may be configured to: control the first light optical output module to output the first light at a first time point; control the second light optical output module to output the second light at a second time point; acquire a first image (e.g., the first image 640) in response to the output of the first light at the first time point by means of the camera; acquire a second image (e.g., the second image 650) in response to the output of the second light at the second time point by means of the camera; synthesize the first image and the second image to create a third image (e.g., the third image 690); calculate the first coordinate values, which are the coordinate values of user's pupils (e.g., the pupils 621) on the basis of the third image; detect a gaze direction of the user on the basis of the first coordinate values.

According to the embodiment, the processor may be configured to calculate second coordinate values, which are coordinate values of the eyes on the basis of the second image.

According to the embodiment, the processor may be configured to calculate a wearing position of the electronic device on the basis of the second coordinate values.

According to the embodiment, the processor may be configured to correct the first coordinate values by means of a variation of the second coordinate values.

According to the embodiment, the processor may be configured to output the first light when calculating the wearing position of the electronic device.

According to the embodiment, the processor may be configured to recognize the user's pupils by means of the second image.

According to the embodiment, the first light optical output module may include a first light emitting unit (e.g., the first light emitting unit 333) configured to emit light, a patterned glass (e.g., the patterned glass 332) in which light emitted from the first light emitting unit is incident and through which the first light that is the structured light passes, and a first lens assembly (e.g., the first lens assembly 331) that includes at least one lens.

According to the embodiment, the camera includes a second lens assembly (e.g., the second lens assembly 351) including at least one lens, a filter (e.g., the filter 352) through which only light of a predetermined wavelength passes, and an image sensor (e.g., the image sensor 353), in which the second lens assembly may include the same optical system as the first lens assembly.

According to the embodiment, the structured light may include a plurality of light spots (e.g., a plurality of light spots 611) disposed in an equally spaced circular manner.

According to the embodiment, the first light and the second light may have at least one of a wavelength in an IR region or a wavelength in a visible light region.

According to the embodiment, the electronic device further includes: a display module (e.g., the display module 214) configured to project an image onto the glass; and a front camera (e.g., the front camera 213) disposed on at least one of the main body and the support to photograph the front of the main body, in which the processor may be configured to: be operatively connected to the display module and the front camera; create front image information by receiving light incident from the front of the main body by the front camera; create an augmented reality (AR) image on the basis of the front image information; determine a position of the AR image on the basis of the detected gaze direction; and output the AR image at the determined position.

According to the embodiment, the processor may be configured to partially adjust a resolution of the AR image according to the gaze direction.

According to the embodiment, the processor may be configured to adjust a position of an object included in the AR image according to the gaze direction.

A method of tracking a user's gaze of an electronic device (e.g., the electronic device 300) and outputting an augmented reality (AR) image according to various embodiments disclosed in the document may include: outputting a first light which is a structured light at a first time point toward the user's eyes; outputting a second light at a second time point toward the user's eyes; acquiring a first image in response to the output of the first light at the first time point; acquiring a second image in response to the output of the second light at the second time point; synthesizing the first image and the second image to create a third image; calculating first coordinate values, which are coordinate values of pupils of the user's eyes on the basis of the third image; and detecting a gaze direction on the basis of the first coordinate values.

According to the embodiment, the method may include: calculating second coordinate values, which are coordinate values of the eyes on the basis of the second image.

According to the embodiment, the method may include: calculating a wearing position of the electronic device on the basis of the second coordinate values.

According to the embodiment, the method may include correcting the first coordinate values by means of a variation of the second coordinate values.

According to the embodiment, the method may include recognizing the user's pupils by means of the second image.

According to the embodiment, the method may include: receiving light from the front to create front image information; creating an augmented reality (AR) image on the basis of the front image information; determining a position of the AR image on the basis of the detected gaze direction; outputting the AR image to the determined position.

According to one embodiment, the method may include partially adjusting a resolution of the AR image according to the gaze direction.

The electronic device according to various embodiments disclosed in the document may be a device in various forms. The electronic device may include, for example, a portable communication device (e.g., a smartphone), a computer device, a portable multimedia device, a portable medical device, a camera, a wearable device, or a home appliance. The electronic device according to the embodiment of the document is not limited to the above-mentioned devices.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module is implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) invokes at least one of the one or more instructions stored in the storage medium, and executes it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a main body;
    a glass supported by the main body;
    a support rotatably connected to the main body;
    first light optical output circuitry configured to irradiate a first light toward eyes of a user disposed at a rear of the main body, the first light being a structured light having a predetermined pattern;
    second light optical output circuitry configured to irradiate a second light toward the eyes of the user, the second light being free from structured light and patterned light;
    a camera configured to photograph the eyes of the user;
    memory storing one or more computer programs; and
    one or more processors communicatively coupled to the first light optical output circuitry, the second light optical output circuitry, the camera, and the memory,
    wherein the one or more computer programs include computer-executable instructions that, when executed by the one or more processors, cause the electronic device to:
        control the first light optical output circuitry to output the first light at a first time point,
        control the second light optical output circuitry to output the second light at a second time point different from the first time point,
        acquire, using the camera, a first image in response to outputting the first light at the first time point, the first image including a shape of the predetermined pattern of the structured light,
        acquire, using the camera, a second image in response to outputting the second light at the second time point, the second image including a shape of the eyes of the user,
        synthesize the first image and the second image to create a third image,
        based on the third image, detect a position of the eyes of the user, a position of the shape of the predetermined pattern of the structured light, and a position of pupils of the eyes of the user,
        based on the position of the eyes of the user, the position of the pupils of the eyes of the user, and the position of the shape of the predetermined pattern, calculate first coordinate values, the first coordinate values being coordinate values of the pupils of the eyes of the user, and
        based on the first coordinate values, detect a gaze direction of the user.

2. The electronic device of claim 1, wherein the one or more computer programs further include computer-executable instructions that, when executed by the one or more processors, cause the electronic device to;
    based on the second image, calculate second coordinate values, the second coordinate values being coordinate values of the eyes of the user.

3. The electronic device of claim 2, wherein the one or more computer programs further include computer-executable instructions that, when executed by the one or more processors, cause the electronic device to;
    based on the second coordinate values, calculate a wearing position of the electronic device.

4. The electronic device of claim 2, wherein the one or more computer programs further include computer-executable instructions that, when executed by the one or more processors, cause the electronic device to;
    correct the first coordinate values by means of a variation of the second coordinate values.

5. The electronic device of claim 3, wherein the one or more computer programs further include computer-executable instructions that, when executed by the one or more processors, cause the electronic device to:

output the first light when calculating the wearing position of the electronic device.

6. The electronic device of claim 1, wherein the one or more computer programs further include computer-executable instructions that, when executed by the one or more processors, cause the electronic device to:
based on the second image, recognize the pupils of the eyes of the user.

7. The electronic device of claim 1, wherein the first light optical output circuitry comprises:
a first light emitter configured to emit light;
a patterned glass in which light emitted from the first light emitter is incident and through which the first light that is the structured light passes; and
a first lens assembly including at least one first lens.

8. The electronic device of claim 7,
wherein the camera comprises:
a second lens assembly including at least one second lens;
a filter through which only light of a predetermined wavelength passes; and
an image sensor, and
wherein the second lens assembly comprises a same optical system as the first lens assembly.

9. The electronic device of claim 1, wherein the structured light comprises a plurality of light spots disposed in an equally spaced circular manner.

10. The electronic device of claim 1, wherein the first light and the second light have at least one of a wavelength in an infrared (IR) region or a wavelength in a visible light region.

11. The electronic device of claim 1, further comprising:
display circuitry configured to project an image onto the glass; and
a front camera disposed on at least one of the main body or the support to photograph a front of the main body,
wherein the one or more processors are communicatively coupled to the display circuitry and the front camera, and
wherein the one or more computer programs further include computer-executable instructions that, when executed by the one or more processors, cause the electronic device to:
create, by the front camera, front image information by receiving light incident from the front of the main body,
based on the front image information, create an augmented reality (AR) image,
based on the gaze direction, determine a position of the AR image, and
output the AR image at the determined position.

12. The electronic device of claim 11, wherein the one or more computer programs further include computer-executable instructions that, when executed by the one or more processors, cause the electronic device to;
partially adjust a resolution of the AR image according to the gaze direction.

13. The electronic device of claim 11, wherein the one or more computer programs further include computer-executable instructions that, when executed by the one or more processors, cause the electronic device to;
adjust a position of an object included in the AR image according to the gaze direction.

14. The electronic device of claim 11, wherein the glass comprises a first glass including a first display panel and a second glass including a second display panel.

15. The electronic device of claim 14, wherein the first display panel and the second display panel are operated as separate components.

16. The electronic device of claim 1, wherein the camera is positioned on the electronic device based on a shape and size of the electronic device.

17. The electronic device of claim 1, wherein the second light irradiated by the second light optical output circuitry comprises a greater amount of light than the first light irradiated by the first light optical output circuitry.

18. A method of performed by an electronic device for tracking a user's gaze and outputting an augmented reality (AR) image, the method comprising:
outputting, by the electronic device, a first light at a first time point toward the eyes of a user, the first light being a structured light having a predetermined pattern;
outputting, by the electronic device, a second light at a second time point toward the eyes of the user, the second time point being different from the first time point, the second light being free from structured light and patterned light;
acquiring, by the electronic device, a first image in response to the outputting of the first light at the first time point, the first image including a shape of the predetermined pattern of the structured light;
acquiring, by the electronic device, a second image in response to the outputting of the second light at the second time point, the second image including a shape of the eyes of the user;
synthesizing, by the electronic device, the first image and the second image to create a third image;
based on the third image, detecting a position of the eyes of the user, a position of the shape of the predetermined pattern of the structured light, and a position of pupils of the eyes of the user;
based on the position of the eyes of the user, the position of the pupils of the eyes of the user, and the position of the shape of the predetermined pattern, calculating, by the electronic device, first coordinate values, the first coordinate values being coordinate values of the pupils of the eyes of the user; and
based on the first coordinate values, detecting, by the electronic device, a gaze direction.

19. The method of claim 18, further comprising:
based on the second image, calculating, by the electronic device, second coordinate values, the second coordinate values being coordinate values of the eyes of the user.

* * * * *